US011452166B2

(12) United States Patent
Zhang et al.

(10) Patent No.: US 11,452,166 B2
(45) Date of Patent: Sep. 20, 2022

(54) DISCONTINUOUS RECEPTION OPERATION FOR NEW RADIO MULTICAST COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Mostafa Khoshnevisan, San Diego, CA (US); Tao Luo, San Diego, CA (US); Wooseok Nam, San Diego, CA (US); Alberto Rico Alvarino, San Diego, CA (US); Le Liu, Fremont, CA (US); Umesh Phuyal, San Diego, CA (US); Prasad Reddy Kadiri, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/090,854

(22) Filed: Nov. 5, 2020

(65) Prior Publication Data
US 2021/0144797 A1    May 13, 2021

Related U.S. Application Data

(60) Provisional application No. 62/932,291, filed on Nov. 7, 2019.

(51) Int. Cl.
*H04W 52/02*    (2009.01)
*H04W 76/28*    (2018.01)
(Continued)

(52) U.S. Cl.
CPC ............. *H04W 76/28* (2018.02); *H04L 1/189* (2013.01); *H04L 1/1812* (2013.01); *H04W 4/06* (2013.01); *H04W 24/08* (2013.01); *H04W 72/042* (2013.01)

(58) Field of Classification Search
None
See application file for complete search history.

(56) References Cited

U.S. PATENT DOCUMENTS

| 9,107,124 B2 * | 8/2015 | Eternad | H04W 72/005 |
| 9,693,274 B2 * | 6/2017 | Eternad | H04W 72/005 |
| 10,079,657 B2 * | 9/2018 | Balasubramanian | H04L 5/0055 |
| 10,715,284 B2 * | 7/2020 | Rollet | H04L 1/1896 |

(Continued)

FOREIGN PATENT DOCUMENTS

EP    3484193 A1    5/2019

OTHER PUBLICATIONS

Ericsson: "Running CR on 36.321 forNB-IoT", 3GPP Draft, 3GPP TSG-RAN WG2 Meeting #107bis, R2-1914099, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019 Nov. 6, 2019 (Nov. 6, 2019), XP051815498, 14 Pages, Retrieved from the Internet: URL:https://ftp.3gpp.org/tsg_ran/WG2_RL2/TSGR2_107bis/Docs/R2-1914099.zip R2-1914099.docx [retrieved on Nov. 6, 2019], section 5.7.

(Continued)

*Primary Examiner* — Sithu Ko
(74) *Attorney, Agent, or Firm* — Holland & Hart LLP; Kevin M. Donnelly

(57) ABSTRACT

Methods, systems, and devices for wireless communications are described. A communication device, such as a user equipment (UE) may receive, in an active duration of a multicast discontinuous reception (DRX) cycle, downlink control information indicating resources of a downlink data (Continued)

channel for a multicast message for a plurality of UE. The UE may monitor the indicated resources for the multicast message, as well as transmit, based on the monitoring the indicated resources, a feedback message corresponding to the multicast message. The UE may initiate a multicast feedback timer based on the monitoring the indicated resources for the multicast message, the multicast feedback timer indicating a time for monitoring for a retransmission of the multicast message. The multicast feedback timer may be different than a unicast feedback timer associated with unicast messages for the UE. In some examples, the UE may initiate a multicast retransmission timer following the multicast feedback timer. The multicast retransmission timer may be different than a unicast retransmission timer associated with the unicast messages.

30 Claims, 18 Drawing Sheets

(51) Int. Cl.
*H04W 72/04* (2009.01)
*H04L 1/18* (2006.01)
*H04W 4/06* (2009.01)
*H04W 24/08* (2009.01)

(56) References Cited

U.S. PATENT DOCUMENTS

| | | | | |
|---|---|---|---|---|
| 10,868,637 | B2* | 12/2020 | Hartman | H04L 12/2816 |
| 10,958,564 | B1* | 3/2021 | Asthana | H04L 45/20 |
| 10,966,061 | B2* | 3/2021 | Shan | H04W 4/00 |
| 11,297,677 | B2* | 4/2022 | Babaei | H04L 5/0055 |
| 2020/0313833 | A1* | 10/2020 | Yi | H04L 5/001 |
| 2021/0105787 | A1* | 4/2021 | Park | H04L 41/0803 |
| 2021/0250131 | A1* | 8/2021 | Fan | H04L 5/003 |
| 2022/0078647 | A1* | 3/2022 | Qu | H04L 5/0055 |

OTHER PUBLICATIONS

Ericsson: "Scheduling Enhancements for LTE-MTC and NB-IoT", 3GPP Draft, 3GPP TSG-RAN WG2 #107bis, R2-1913113—Scheduling Enhancement, 3rd Generation Partnership Project (3GPP), Mobile Competence Centre 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804837, pp. 1-12, Retrieved from the Internet: URL:https://ftp.3gpp.org/tsg_ran/WG2_RL2/TSGR2_107bis/Docs/R2-1913113.zip R2-1913113—Scheduling Enhancement.docx [retrieved on Oct. 4, 2019] section 2.1.1, section 2.1.2 section 2.1.3.
International Search Report and Written Opinion—PCT/US2020/059462—ISA/EPO—dated Mar. 2, 2021.

* cited by examiner

DISCONTINUOUS RECEPTION OPERATION FOR NEW RADIO MULTICAST COMMUNICATIONS

CROSS REFERENCE

The present Application for patent claims the benefit of U.S. Provisional Patent Application No. 62/932,291 by ZHANG et al., entitled "DISCONTINUOUS RECEPTION OPERATION FOR NEW RADIO MULTICAST COMMUNICATIONS," filed Nov. 7, 2019, assigned to the assignee hereof, and expressly incorporated by reference herein.

TECHNICAL FIELD

The following relates generally to wireless communications and more specifically to discontinuous reception (DRX) operation for new radio (NR) multicast communications.

DESCRIPTION OF RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipments (UEs). Some wireless communications systems, such as 4G and 5G systems, may support multicast services (for example, a multimedia broadcast multicast service (MBMS)). Some wireless communications systems may support discontinuous reception (DRX) operations for multicast communications (for example, such as single cell-point to multipoint (SC-PTM) communications) corresponding to a group-radio network temporary identifier (G-RNTI) associated with the multicast service. One or more of a single cell multicast control channel (SC-MCCH) and a multicast transport channel (SC-MTCH) may carry SC-PTM control and data information. In some examples, the SC-PTM control information may include scheduling information, such as an SC-MTCH scheduling cycle (for example, a DRX cycle), an SC-MTCH active duration (for example, an SC-MTCH ON duration), an SC-MTCH inactive duration (for example, an SC-MTCH inactivity timer), among other examples. As demand for communication efficiency increases, some wireless communications systems may fail to provide feedback for multicast communications associated with the multicast service, and thereby may be unable to support high reliability and low latency multicast services, among other examples.

SUMMARY

The described techniques may relate to configuring a communication device, which may be a user equipment (UE), to support discontinuous reception (DRX) operations for multicast communications in fifth generation (5G) systems, which may be referred to as New Radio (NR) systems. In some examples, the multicast communications may relate to a multicast service (for example, a multimedia broadcast multicast service (MBMS)). As demand for communication efficiency increases, some wireless communications systems may fail to provide suitable DRX operations for multicast communications, and thereby may be unable to support high reliability and low latency multicast services. To address the above shortcomings, the communication device may be configured to support feedback (for example, a hybrid automatic repeat request (HARQ) feedback) for a multicast service. The described techniques may be used to configure the communication device, in some examples, to support device-specific (for example, UE-specific) feedback, as well as group-specific feedback for the multicast service. The described techniques may enable the communication device to support feedback in view of a feedback mode (for example, the device-specific feedback or the group-specific feedback) for DRX operations associated with multicast communications in 5G systems. The described techniques may include features for improvements to power consumption, spectral efficiency, higher data rates and, in some examples, may promote enhanced efficiency for high reliability and low latency multicast services in 5G systems, among other benefits.

One innovative aspect of the subject matter described in this disclosure can be implemented in a method for wireless communications at a UE. The method includes receiving, in an active duration of a multicast DRX cycle, downlink control information indicating resources of a downlink data channel for a multicast message for a set of UEs, including the UE, monitoring the indicated resources for the multicast message, transmitting, based on the monitoring the indicated resources, a feedback message corresponding to the multicast message, and initiating a multicast feedback timer based at least in part on the monitoring the indicated resources for the multicast message, the multicast feedback timer indicating a time for monitoring for a retransmission of the multicast message, the multicast feedback timer different than a unicast feedback timer associated with unicast messages for the UE.

Another innovative aspect of the subject matter described in this disclosure can be implemented in an apparatus for wireless communications at a UE. The apparatus includes a processor, memory coupled with the processor, and instructions stored in the memory. The instructions may be executable by the processor to cause the apparatus to receive, in an active duration of a multicast DRX cycle, downlink control information indicating resources of a downlink data channel for a multicast message for a set of apparatuses, including the apparatus, monitor the indicated resources for the multicast message, transmit, based on the monitoring the indicated resources, a feedback message corresponding to the multicast message, and initiate a multicast feedback timer based at least in part on the monitoring the indicated resources for the multicast message, the multicast feedback timer indicating a time for monitoring for a retransmission of the multicast message, the multicast feedback timer different than a unicast feedback timer associated with unicast messages for the apparatus.

Another innovative aspect of the subject matter described in this disclosure can be implemented in an apparatus for wireless communications at a UE. The apparatus includes means for receiving, in an active duration of a multicast DRX cycle, downlink control information indicating resources of a downlink data channel for a multicast message for a set of apparatuses, including the apparatus, monitoring the indicated resources for the multicast message, transmitting, based on the monitoring the indicated resources, a feedback message corresponding to the multicast message, and initiating a multicast feedback timer based at least in part on the monitoring the indicated resources for the multicast message, the multicast feedback timer indicating a time for monitoring for a retransmission of the multicast message, the multicast feedback timer different than a unicast feedback timer associated with unicast messages for the apparatus.

Another innovative aspect of the subject matter described in this disclosure can be implemented in non-transitory computer-readable medium storing code for wireless communications at a UE. The code includes instructions executable by a processor to receive, in an active duration of a multicast DRX cycle, downlink control information indicating resources of a downlink data channel for a multicast message for a set of UEs, including the UE, monitor the indicated resources for the multicast message, transmit, based on the monitoring the indicated resources, a feedback message corresponding to the multicast message, and initiate a multicast feedback timer based at least in part on the monitoring the indicated resources for the multicast message, the multicast feedback timer indicating a time for monitoring for a retransmission of the multicast message, the multicast feedback timer different than a unicast feedback timer associated with unicast messages for the UE.

Some examples of the method, apparatuses, and non-transitory computer-readable medium described herein may further include operations, features, means, or instructions for initiating a multicast retransmission timer following the multicast feedback timer, the multicast retransmission timer indicating a time duration for the monitoring for the retransmission of the multicast message, wherein the multicast retransmission timer is different than a unicast retransmission timer associated with the unicast messages.

Some examples of the method, apparatuses, and non-transitory computer-readable medium described herein may further include operations, features, means, or instructions for initiating a multicast retransmission timer following the multicast feedback timer, the multicast retransmission timer having a same value as a unicast retransmission timer associated with the unicast messages.

Some examples of the method, apparatuses, and non-transitory computer-readable medium described herein may further include operations, features, means, or instructions for initiating the multicast feedback timer may be based on the timer configuration.

In some examples of the method, apparatuses, and non-transitory computer-readable medium described herein, receiving the timer configuration may include operations, features, means, or instructions for receiving the timer configuration via a multicast control channel (MCCH).

In some examples of the method, apparatuses, and non-transitory computer-readable medium described herein, receiving the timer configuration may include operations, features, means, or instructions for receiving the timer configuration via UE-specific signaling.

In some examples of the method, apparatuses, and non-transitory computer-readable medium described herein, the timer configuration includes one or more of an indication of a duration of the multicast feedback timer or a duration of a multicast retransmission timer.

Some examples of the method, apparatuses, and non-transitory computer-readable medium described herein may further include operations, features, means, or instructions for determining one or more of a duration of the multicast feedback timer or a duration of the multicast retransmission timer based on the multicast service associated with the multicast message.

In some examples of the method, apparatuses, and non-transitory computer-readable medium described herein, the timer configuration includes a group radio network temporary identifier (G-RNTI), and one or more of the multicast feedback timer or the multicast retransmission timer correspond to the G-RNTI.

In some examples of the method, apparatuses, and non-transitory computer-readable medium described herein, the feedback message includes a negative acknowledgement, and where initiating the multicast retransmission timer following the multicast feedback timer may be based on the negative acknowledgement.

In some examples of the method, apparatuses, and non-transitory computer-readable medium described herein, the downlink data channel includes a physical downlink shared channel (PDSCH).

DETAILED DESCRIPTION

Figure 1:
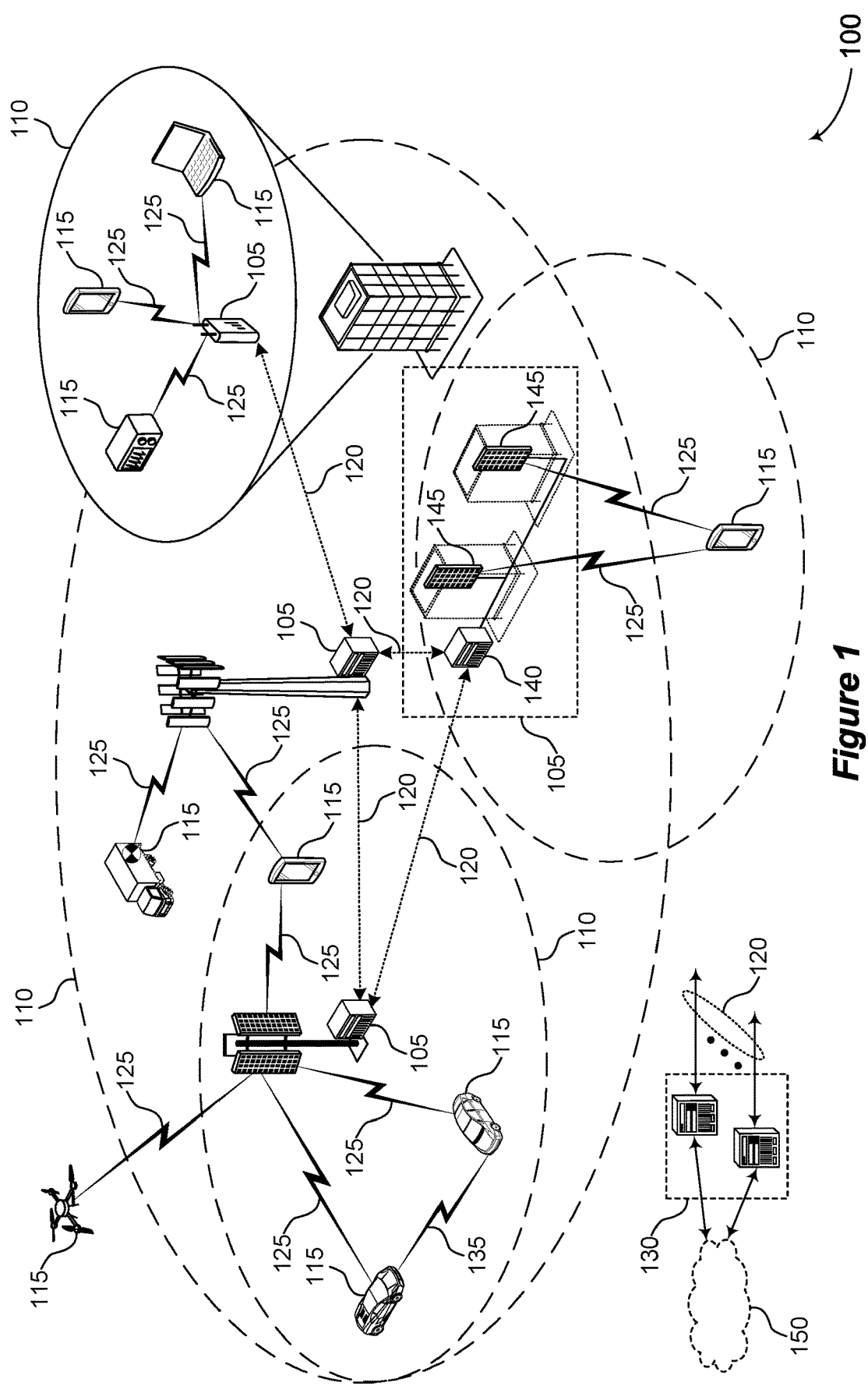
FIGS. 1 and 2 illustrate examples of wireless communications systems that support discontinuous reception (DRX) operation for new radio (NR) multicast communications in accordance with aspects of the present disclosure.

Some wireless communications systems may include communication devices, such as user equipments (UEs) and base stations, for example, eNodeBs (eNBs), next-generation NodeBs or giga-NodeBs (either of which may be referred to as a gNB) that may support multiple radio access technologies including fourth generation (4G) systems such as Long Term Evolution (LTE) systems and fifth generation (5G) systems, which may be referred to as New Radio (NR) systems. In some cases, some wireless communications systems, such as 4G and 5G systems, may support discontinuous reception (DRX) operations for unicast communications, which may relate to a unicast service. A unicast service may include a point-to-point communication scheme in which information (for example, in the form of packets) is transmitted from a single source (for example, a base station) to a single destination (for example, a UE).

Some wireless communications systems, such as 4G and 5G systems, may support DRX operations for multicast communications, which may relate to a multicast service (for example, a multimedia broadcast multicast service (MBMS)). A multicast service may include a point-to-multipoint communication scheme in which information (for example, in the form of packets) is transmitted simultaneously from a single source (for example, a base station) to multiple destinations (for example, multiple communication devices). Additionally, a multicast service may refer to a distribution of information among a specific group of communication devices (for example, a group of UEs) that are subscribed to the multicast service. As demand for communication efficiency and reliability increases, some wireless communications systems may fail to provide suitable DRX operations for multicast communications, and thereby may be unable to support high reliability and low latency multicast services.

To address the above shortcomings of current wireless communications systems, various aspects are described herein to support feedback (for example, a hybrid automatic repeat request (HARQ) feedback) for a multicast service. The described techniques may be used to configure communication devices, in some examples, to support device-specific (for example, UE-specific) feedback, as well as group-specific feedback for the multicast service. The described techniques may enable the communication devices to support feedback in view of a feedback mode (for example, the device-specific feedback or the group-specific feedback) for DRX operations associated with multicast communications in 5G systems. In some examples, the communication devices may be configured to receive, in an active duration of a multicast DRX cycle, downlink control information indicating resources of a downlink data channel for a multicast message for a group of communication devices. In some examples, the communication devices may be configured to monitor the resource for the multicast message. The communication devices may be configured to transmit, based on the monitoring, a feedback message (for example, a positive acknowledgment or a negative acknowledgement) corresponding to the multicast message.

In some examples, the communication devices may initiate one or more of a multicast feedback timer based on the monitoring for the multicast message or a multicast retransmission timer following the multicast feedback timer. The multicast-specific timers may provide a mechanism for the communication devices to support DRX operation (for example, MBMS DRX operation) for multicast communications, and may be different than unicast-specific timers for unicast communications, such as a unicast feedback timer and a unicast retransmission timer. The multicast feedback timer may indicate a time a UE may begin monitoring for multicast retransmission(s) based on a multicast feedback message, and may be triggered based on the reception time of a multicast message or a transmission time of the multicast feedback message. The multicast feedback timer may be different than a unicast feedback timer, which may indicate a time a UE may begin monitoring for unicast retransmission(s) based on a unicast feedback message, and may be triggered based on the reception time of a unicast message or a transmission time of the unicast feedback message. In some aspects, the multicast feedback timer may correspond to a round trip time (RTT) for multicast messages, which may be different than unicast feedback timer corresponding to a RTT for unicast messages. Further, a multicast retransmission timer may indicate a duration or time window in which retransmission of a multicast message may occur, and may be different than a unicast retransmission timer that indicates a duration or time window in which retransmission of a unicast message may occur.

Particular aspects of the subject matter described in this disclosure may be implemented to realize one or more of the following potential advantages. For example, operations performed by the described communication devices may provide improvements to multicast communications when operating in 5G systems. In some examples, configuring the described communication devices with use of both unicast-specific timers, as well as multicast-specific timers in 5G systems may support improvements to power consumption, spectral efficiency, higher data rates and, in some examples, may promote enhanced efficiency for multicast operations, among other benefits. For example, by configuring the described communication devices with use of both unicast-specific timers and multicast-specific timers, among other examples, the described communication devices may experience reduced power consumption because the communication devices may be capable of reducing an active duration (for example, an awake duration) of the communication devices.

Aspects of the disclosure are initially described in the context of wireless communications systems. Aspects of the disclosure are then illustrated by and described with reference to timelines that relates to DRX operation for NR multicast communications. Aspects of the disclosure are further illustrated by and described with reference to apparatus diagrams, system diagrams, and flowcharts that relate to DRX operation for NR multicast communications.

FIG. 1 illustrates an example of a wireless communications system 100 that supports a DRX operation for NR multicast communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a NR network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode and an initial acquisition and connection may be conducted by the UEs 115 via the carrier, or the carrier may be operated in a non-standalone mode and a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, the symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), multiple spatial layers are transmitted to the same receiving device, and multiple-user MIMO (MU-MIMO), multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, the device may provide HARQ feedback in a specific slot for data received in a previous symbol in the slot. In other cases, the device may provide HARQ feedback in a subsequent slot, or according to some other time interval.

Figure 2:
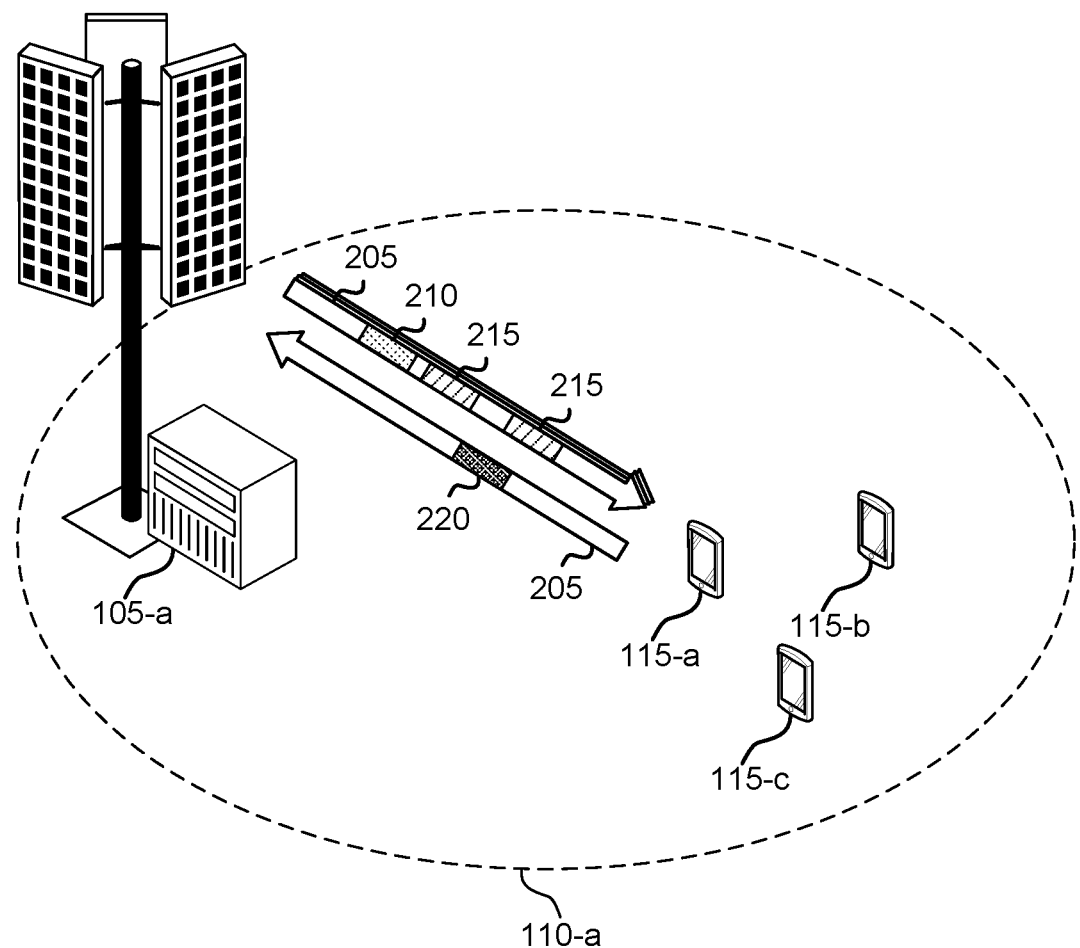

FIG. 2 illustrates an example of a wireless communications system 200 that supports a DRX operation for NR multicast communications in accordance with aspects of the present disclosure. In some examples, the wireless communications system 200 may implement aspects of the wireless communications system 100. For example, the wireless communications system 200 may include a base station 105-a, a UE 115-a, a UE 115-b, and a UE 115-c within a geographic coverage area 110-a. The base station 105-a, the UE 115-a, the UE 115-b, and the UE 115-c may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency multicast operations, among other benefits.

In the wireless communications system 200, the base station 105-a and the UE 115-a may support unicast communications, which may relate to a unicast service. The unicast service may include a point-to-point communication scheme in which information (for example, in the form of packets) is transmitted from a single source (for example, the base station 105-a) to a single destination (for example, the UE 115-a). Additionally or alternatively, in the wireless communications system 200, the UE 115-a may support multicast communications, which may relate to a multicast service (for example, an MBMS). The multicast service may include a point-to-multipoint communication scheme in which information (for example, in the form of packets) is transmitted simultaneously from a single source (for example, the base station 105-a) to multiple destinations (for example, the UE 115-a, the UE 115-b, and the UE 115-c). Additionally, a multicast service may refer to a distribution of information among a specific group of communication devices (for example, a group of UEs 115 including the UE 115-a, the UE 115-b, and the UE 115-c) that are subscribed to the multicast service. For example, the UE 115-a, the UE 115-b, and the UE 115-c may form a group of UEs that are subscribed to the multicast service (for example, an MBMS).

As demand for communication efficacy and reliability increases, the base station 105-a may configure the UE 115-a to provide a feedback message (for example, a HARQ feedback message) for multicast services as part of supporting DRX operation for multicast communications. In some examples, the base station 105-a may configure the UE 115-a to support UE-specific feedback, as well as group-specific feedback (for example, related to a group of UEs, such as the UE 115-a, the UE 115-b, and the UE 115-c). The base station 105-a may enable the UE 115-a to support feedback in view of a feedback mode including the device-specific feedback or the group-specific feedback, for DRX operations associated with multicast communications in the wireless communications system 200 (for example, a 5G system).

In some examples, the base station 105-a may configure the UE 115-a to provide a feedback message (for example, a HARQ feedback message) for multicast services as part of supporting DRX operation for multicast communications, by transmitting, via one or more directional beams 205 (for example, downlink directional beams), a timer configuration corresponding to a multicast service. In some examples, the base station 105-*a* may transmit, and the UE 115-*a* may receive, the timer configuration via a multicast control channel (for example, a multicast service control channel (SC-MCCH)). In some other examples, the base station 105-*a* may transmit, and the 115-*a* may receive, the timer configuration via a UE-specific signaling (for example, an RRC signaling). The timer configuration may include one or more of an indication of a duration of a multicast feedback timer (also referred to as a HARQ RTT timer) or a duration of a multicast retransmission timer. In some examples, the timer configuration may include a G-RNTI, and one or more of the multicast feedback timer or the multicast retransmission timer may correspond to the G-RNTI. For example, the G-RNTI may correspond to a group of UEs including the UE 115-*a* that are subscribed to the multicast service.

In some examples, the base station 105-*a* may transmit, to the UE 115-*a*, downlink control information 210 via one or more directional beams 205. The UE 115-*a* may receive the downlink control information 210 in an active duration of a multicast DRX cycle. The downlink control information 210 may carry an indication of a resource allocation associated with a downlink data channel for the multicast message 215 for the UE 115-*a*. In some examples, the downlink control information 210 may carry the timer configuration. The UE 115-*a* may monitor one or more resources (for examples, symbols, slots, subframes, as well as subcarriers or carriers) for the multicast message 215. The base station 105-*a* may transmit the multicast message 215 on a physical downlink shared channel (PDSCH). As such, the UE 115-*a* may monitor resources associated with the PDSCH. The UE 115-*a* may transmit, to the base station 105-*a*, a feedback message 220 based on the monitoring (for example, the feedback message 220 may indicate a reception of the multicast message 215 or a failure of the reception of the multicast message 215).

In some examples, the UE 115-*a* may initiate a multicast feedback timer (also referred to as a "drx-HARQ-RTT-TimerDL-Multicast" timer) based on monitoring (for example, a PDSCH) for the multicast message 215. The multicast feedback timer may be different than a unicast feedback timer associated with unicast messages for the UE 115-*a*. Additionally, in some examples, the UE 115-*a* may initiate a multicast retransmission timer (also referred to as a "drx-RetransmissionTimerDL-Multicast" timer) following the multicast feedback timer. The multicast retransmission timer may also be different than a unicast retransmission timer associated with the unicast messages. In some examples, the multicast retransmission timer may have a same value as a unicast retransmission timer associated with the unicast messages. In some examples, the UE 115-*a* may initiate the multicast retransmission timer depending on the feedback message 220. For example, the UE 115-*a* may initiate the multicast retransmission timer when the feedback message 220 is a negative acknowledgement.

The UE 115-*a* may determine one or more of a duration of the multicast feedback timer or a duration of the multicast retransmission timer based on the multicast service associated with the multicast message 215. The duration of the multicast feedback timer and the duration of the multicast retransmission timer may be a mechanism for the UE 115-*a* to provide the feedback message 220 and monitor for a retransmission of the multicast message 215 (for example, when the feedback message 220 includes a negative acknowledgement). The UE 115-*a* may support use of the multicast feedback timer or the multicast retransmission timer, or both, for multicast communications when the UE 115-*a* is configured to provide HARQ feedback for a multicast service. An example timeline using a multicast feedback timer and a multicast retransmission timer is described with reference to FIG. 3.

Figure 3:
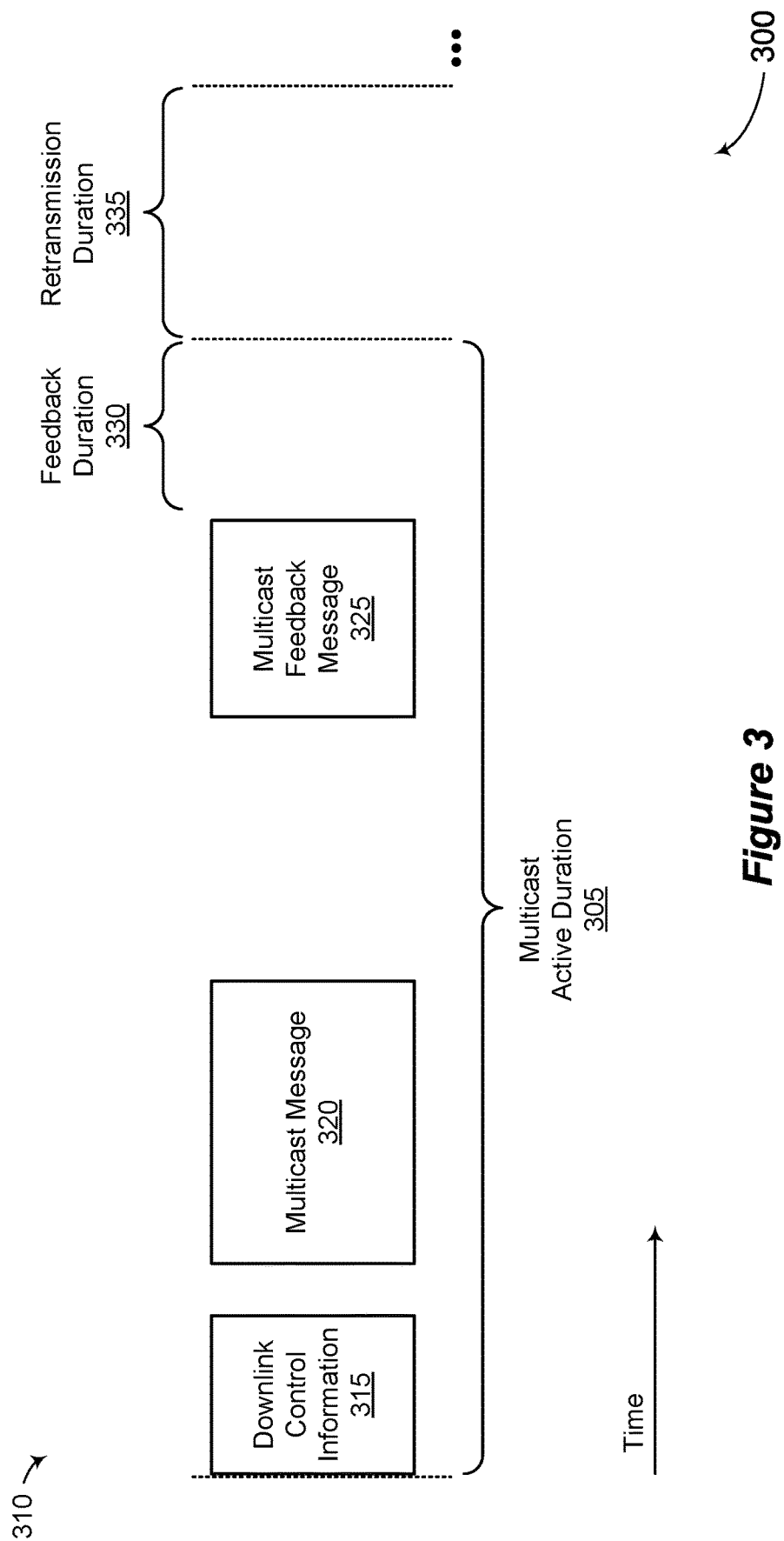
FIGS. 3-10 illustrate examples of timelines that support DRX operation for NR multicast communications in accordance with aspects of the present disclosure.

FIG. 3 illustrates an example of a timeline 300 that supports a DRX operation for NR multicast communications in accordance with aspects of the present disclosure. In some examples, the timeline 300 may also implement aspects of the wireless communications system 100 and 200, as described with reference to FIGS. 1 and 2. For example, the timeline 300 may be based on a configuration by a base station 105 or a UE 115, and implemented by the UE 115. The timeline 300 in the example of FIG. 3 may be illustrative of a timeline for when the UE 115 is configured with DRX operation capability for multicast communications in 5G systems. For example, the timeline 300 may include a multicast active duration 305 (also referred to as a G-RNTI ON duration) of a multicast DRX cycle 310. The multicast DRX cycle 310 may also include a multicast inactive duration (not shown). The multicast active duration 305, as well as the multicast inactive duration, may correspond to time and frequency resources. For example, the multicast active duration 305 and the multicast inactive duration (not shown) may correspond to a number of subframe cycles, with each subframe in a cycle having a subframe index ranging from 0 to 9. Each subframe cycle or subframe index, or both, may relate to one or more symbols and subcarriers.

With reference to FIGS. 1 and 2, and in accordance with the timeline 300, a UE 115 may receive, from a base station 105, downlink control information 315 in the multicast active duration 305 of the multicast DRX cycle 310. The downlink control information 315 may carry a resource allocation associated with a downlink data channel (for example, a PDSCH) for a multicast message 320 for the UE 115, which may be one of a group of UEs 115 that are subscribed to a multicast service or multiple multicast services. For example, the base station 105 may transmit, to the group of UEs 115, the multicast message 320 on a PDSCH via one or more directional downlink beams.

The UE 115 may transmit a multicast feedback message 325, in accordance with the timeline 300, to the base station 105 based on monitoring, for example, for a reception of the multicast message 320 or a failed reception of the multicast message 320. In some examples, the downlink control information 315 may also carry a timer configuration associated with one or more of a multicast feedback timer or a multicast retransmission timer. The UE 115 may initiate a multicast feedback timer based on monitoring for the multicast message 320. The multicast feedback timer may correspond to a feedback duration 330. In some examples, the multicast feedback timer may be different than a unicast feedback timer associated with unicast messages for the UE 115. In some examples, the UE 115 may initiate the multicast feedback timer after the UE 115 transmits the multicast feedback message 325.

In some examples, the UE 115 may also initiate the multicast retransmission timer following the multicast feedback timer (for example, following the feedback duration 330). The multicast retransmission timer may correspond to a retransmission duration 335. In some examples, the multicast retransmission timer may be different than a unicast retransmission timer associated with the unicast messages. In some examples, the UE 115 may initiate the multicast retransmission timer based on the multicast feedback message 325 and based on the feedback duration 330 lapsing (for example, the multicast feedback timer expiring). The UE 115 may, in some examples, initiate the multicast retransmission timer when the multicast feedback message 325 is a negative acknowledgement (or in other words, when the multicast feedback message 325 indicates a failure to receive the multicast message 320). Otherwise, the UE 115 may refrain from initiating the multicast retransmission timer when the multicast feedback message 325 is a positive acknowledgement, for example, due to a successful reception of multicast message 320.

Returning to FIG. 2, in some examples, the base station 105-a may configure a G-RNTI, which may correspond to one or more of the multicast feedback timer or the multicast retransmission timer. In some examples, the base station 105-a may configure one or more of the multicast feedback timer or the multicast retransmission timer for a multicast service or multiple multicast services. In some other examples, the base station 105-a may configure separate multicast feedback timers or separate multicast retransmission timers for each multicast service of the multiple multicast services. In other words, each multicast service may have a separate corresponding multicast feedback timer (including a duration) or multicast retransmission timer (including a duration), or both.

The base station 105-a may transmit to the UE 115-a a timer configuration corresponding to a multicast service. UE 115-a may identify the timer configuration for the UE 115-a related to the multicast service based on the signaling received from base station 105-a. In some examples, the signaling may include control channel signaling. For example, the base station 105-a may transmit, and the UE 115-a may receive, the timer configuration in a multicast control message on an MCCH. In some other examples, the signaling may include UE-specific signaling, such as RRC signaling. For example, the base station 105-a may transmit, and the UE 115-a may receive, the timer configuration in an RRC configuration message.

In some examples, when a group of UEs 115 (for example the UE 115-a, the UE 115-b, and the UE 115-c), in the wireless communications system 200 receive multicast messages, which may relate to a same multicast service, the UEs 115 may transmit separate feedback messages on common resources associated with the feedback messages. For example, the UE 115-a may determine a resource allocation associated with the feedback message 220. The resource allocation may include common resources (for example, common time and frequency resources) associated with the group of UEs 115. For example, the UE 115-a may receive the multicast message 215, which may relate to a same multicast service, and the UE 115-a may transmit the feedback messages 220 on common resources associated with the feedback message 220 (for example, common resource related to as a group of UEs, such the UE 115-a, the UE 115-b, and the UE 115-c).

In some examples, a UE 115 (for example, the UE 115-a) in the group of UEs 115 may transmit a feedback message (for example, the feedback message 220) over a feedback duration. In some examples, one or more of a duration of the multicast feedback timer or a duration of a multicast retransmission timer associated with a UE 115 (for example, the UE 115-a) in the group of UEs 115 may be aligned with one or more of a duration of a different multicast feedback timer or a duration of a different multicast retransmission timer associated with a different UE 115 (such as, the UE 115-b or the UE 115-c) in the group of UEs 115. Different UEs 115 in the group of UEs 115 may have aligned feedback durations and retransmission durations.

In other examples, when a group of UEs 115 in the wireless communications system 200 receive multicast messages, which may relate to a multicast service, the UEs 115 may transmit separate feedback messages on UE-specific resources associated with the feedback messages. In some examples, the UE 115-a may determine a resource allocation associated with the feedback message 220. The resource allocation may include UE-specific resources (for example, UE-specific time and frequency resources) associated with the UE 115-a in the group of UEs 115. For example, the UE 115-a may receive the multicast message 215, which may relate to a multicast service, and the UE 115-a may transmit the feedback messages 220 associated with the multicast message 215 on UE-specific resources specific to the UE 115-a and associated with the feedback message 220. For example, different UE-specific resources may be provided for the UE 115-a, the UE 115-b, and the UE 115-c to use to transmit feedback messages on different feedback resources. The different feedback resources may include one or more of different time, frequency, or code resources.

Similarly, the UE 115-b or the UE 115-c may determine a resource allocation associated with a feedback message. The resource allocation may include UE-specific resources (for example, UE-specific time and frequency resources) associated with the UE 115-b or the UE 115-c. In some examples, a group of UEs 115 may transmit separate feedback messages at different transmission time intervals (for example, symbols, slots) depending on a UE-specific configuration. For example, the UE 115-a may transmit the feedback message 220 over a transmission time interval associated with the UE 115-a and on resources of the UE-specific resources for the UE 115-a. The transmission time interval may correspond to a number of transmission time intervals associated with the group of UEs 115.

In some examples, to support both common resources and UE-specific resources, the base station 105-a may configure a duration of the multicast feedback timer to occur (for example, begin) after the multicast message 215 transmission. The UE 115-a may, for example, initiate the multicast feedback timer after one or more of receiving the downlink control information 210 on a downlink control channel (for example, a physical downlink control channel (PDCCH)) or receiving a downlink data channel (for example, PDSCH) carrying the multicast message 215. The UE 115-a may initiate the multicast feedback timer, after transmitting the feedback message 220 (for example, after transmitting a negative acknowledgement) while the multicast feedback timer counts from the end of the downlink control information 210 transmission or the multicast message 215 transmission. In some examples, the UE 115-a may initiate the multicast retransmission timer following the multicast feedback timer based on an ending of the multicast feedback timer.

The base station 105-a may be configured to transmit an indication to the UE 115-a configuring the UE 115-a to initiate the multicast feedback timer according to the timer configuration. For example, if the UE 115-a is configured to exclusively use common resources for multicast feedback (for example, for transmitting the feedback message 220), the UE 115-a may initiate the multicast feedback timer after transmitting the feedback message 220. For example, the UE 115-a may determine a resource allocation related to the feedback message 220 that may include common resources, and transmit the feedback message 220 on the common resources during a feedback duration associated with the multicast feedback timer.

The UE 115-a may initiate the multicast feedback timer after transmitting the feedback message 220 based on the resource allocation including the common resources. If the UE 115-a is configured to exclusively use UE-specific resources for transmitting the feedback message 220, the UE 115-*a* may initiate the multicast feedback timer after the downlink control information 210 transmission or the multicast message 215 transmission. For example, the UE 115-*a* may determine a resource allocation related to the feedback message 220. The resource allocation may include UE-specific resources. The UE 115-*a* may initiate the multicast feedback timer after one or more of receiving the downlink control information 210 on a PDCCH or receiving a PDSCH carrying the multicast message 215 based on the resource allocation including the UE-specific resources. An example timeline using a multicast feedback timer and a multicast retransmission timer is described with reference to FIG. 4.

Figure 4:
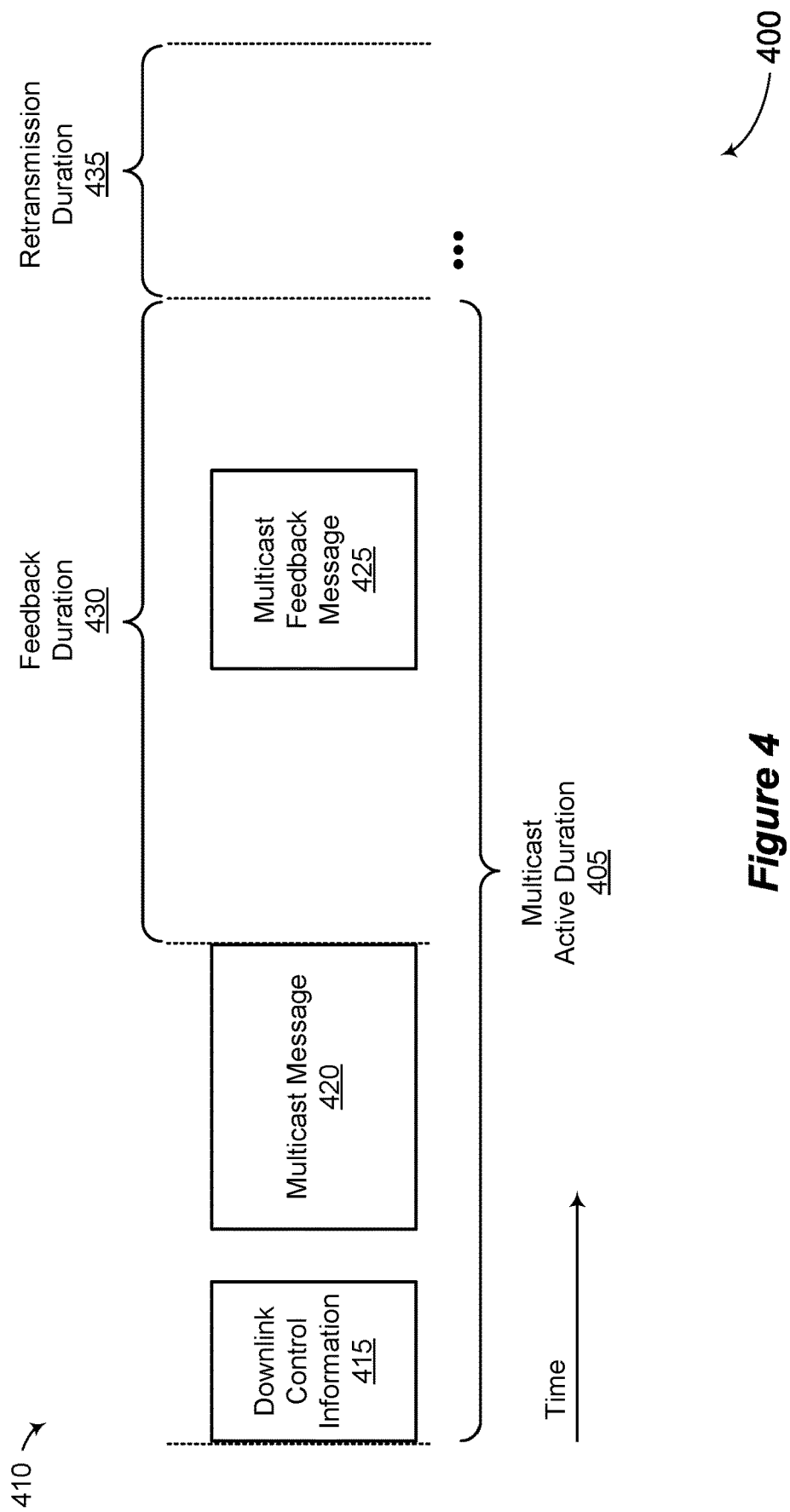

FIG. 4 illustrates an example of a timeline 400 that supports a DRX operation for NR multicast communications in accordance with aspects of the present disclosure. In some examples, the timeline 400 may also implement aspects of the wireless communications system 100 and 200, as described with reference to FIGS. 1 and 2. For example, the timeline 400 may be based on a configuration by a base station 105 or a UE 115, and implemented by the UE 115. The timeline 400 in the example of FIG. 4 may be illustrative of a timeline for when the UE 115 is configured with DRX operation capability for multicast communications in 5G systems. For example, the timeline 400 may include a multicast active duration 405 (also referred to as a G-RNTI ON duration) of a multicast DRX cycle 410. The multicast DRX cycle 410 may also include a multicast inactive duration (not shown). The multicast active duration 405, as well as the multicast inactive duration (not shown), may correspond to time and frequency resources. For example, the multicast active duration 405 and the multicast inactive duration may correspond to a number of subframe cycles, with each subframe in a cycle having a subframe index ranging from 0 to 9. Each subframe cycle or subframe index or both may relate to one or more symbols and subcarriers.

With reference to FIGS. 1 and 2, and in accordance with the timeline 400, a UE 115 may receive downlink control information 415 from a base station 105 (for example, on a PDCCH) in the multicast active duration 405 of the multicast DRX cycle 410. The downlink control information 415 may carry an indication of a resource allocation associated with a downlink data channel (for example, a PDSCH) for a multicast message 420 for the UE 115, which may belong to a group of UEs 115. The UE 115 may transmit a multicast feedback message 425, in accordance with the timeline 400, to the base station 105 based on monitoring, for example, for a reception of the multicast message 420 or a failure to receive the multicast message 420.

In some examples, the downlink control information 415 may also carry a timer configuration associated with one or more of a multicast feedback timer or a multicast retransmission timer. The UE 115 may initiate a multicast feedback timer based on monitoring for the multicast message 420 from the base station 105. The multicast feedback timer may correspond to a feedback duration 430. In some examples, the multicast feedback timer may be different than a unicast feedback timer associated with unicast messages for the UE 115. In some examples, the UE 115 may initiate the multicast feedback timer after the UE 115 transmits the multicast feedback message 425. The UE 115 may also initiate the multicast retransmission timer following the multicast feedback timer (for example, following the feedback duration 430).

The multicast retransmission timer may correspond to a retransmission duration 435. In some examples, the multicast retransmission timer may be different than a unicast retransmission timer associated with the unicast messages. In some examples, the UE 115 may initiate the multicast retransmission timer based on the multicast feedback message 425 and based on the feedback duration 430 lapsing (that is, the multicast feedback timer expiring). For example, the UE 115 may initiate the multicast retransmission timer when the multicast feedback message 425 is a negative acknowledgement (or in other words, when the multicast feedback message 425 indicates a failure of the reception of the multicast message 420). Otherwise, the UE 115 may refrain from initiating the multicast retransmission timer when the multicast feedback message 425 is a positive acknowledgement, due to a successful reception of the multicast message 420.

The base station 105 may, in some examples, be configured to transmit an indication to the UE 115 on how to initiate the multicast feedback timer. The UE 115 may determine a resource allocation related to the multicast feedback message 425. If the UE 115 is configured to exclusively use common resources for the multicast feedback message 425, the UE 115 may initiate the multicast feedback timer after transmitting the multicast feedback message 425. Alternatively, if the UE 115 is configured to exclusively use UE-specific resources for the multicast feedback message 425, the UE 115 may initiate the multicast feedback timer corresponding to the feedback duration 430 after receiving the downlink control information 415 (for example, on a PDCCH) or receiving the multicast message 420 (for example, on a PDSCH).

Returning to FIG. 2, in some examples, the base station 105-*a* may configure the UE 115-*a* to support dynamic switching between unicast operation and multicast operation. By supporting dynamic switching between unicast operation and multicast operation, the UE 115-*a* may receive a retransmission of the multicast message 215 either as a multicast transmission or a unicast transmission. For example, the UE 115-*a* may receive a retransmission of the multicast message 215, and the retransmission may be a unicast message for the UE 115-*a*. The UE 115-*a* may be configured to support unicast DRX operation, in addition to multicast DRX operation, based on supporting dynamic switching between unicast operation and multicast operation.

As part of supporting dynamic switching between unicast operation and multicast operation, the base station 105-*a* may configure the UE 115-*a* to support a unicast feedback timer or a unicast retransmission timer, or both, as well as usage (coexistence) between a unicast feedback timer, a unicast retransmission timer, a multicast feedback timer, and a multicast retransmission timer. Because the UE 115-*a* may support unicast DRX operation in addition to multicast DRX operation, the UE 115-*a* may, in some examples, be configured to use a unicast feedback timer or a unicast retransmission timer for multicast communications (for example, multicast DRX operation). The multicast timers may or may not be the same as the unicast timers. In some examples, the base station 105-*a* may configure the UE 115-*a* with a UE-specific multicast feedback timer and a UE-specific multicast retransmission timer for multicast communications. Alternatively, the base station 105-*a* may configure the UE 115-*a* with a separate UE-specific multicast feedback timer and a separate UE-specific multicast retransmission timer for multicast communications.

In some examples, the base station 105-*a* may configure the UE 115-*a* to use a group-specific timer (also referred to as G-RNTI specific timer) or a UE-specific timer for multicast communications. The UE-specific timer may correspond to one or more of a multicast feedback timer and a multicast retransmission timer corresponding to a specific one of the group of UEs 115 including the UE 115-a, the UE 115-b, and the UE 115-c. For example, if the UE 115-a is not configured with a UE-specific timer, the UE 115-a may use the group-specific timer for multicast communications. The group-specific timer may be applicable among the group of UEs 115 (for example, the UE 115-a, the UE 115-b, and the UE 115-c) that are subscribed to a multicast service or multiple multicast services. The group-specific timer may correspond to one or more of a multicast feedback timer and a multicast retransmission timer, both of which may be used by the group of UEs 115 (for example, the UE 115-a, the UE 115-b, and the UE 115-c) that are subscribed to the multicast service or the multiple multicast services.

When supporting both UE-specific timers and group-specific timers including one or more of a multicast feedback timer and a multicast retransmission timer, the UE 115-a may adjust DRX operation appropriately. Example timelines using one or more of UE-specific timers and group-specific timers are described with reference to FIGS. 5-8.

Figure 5:
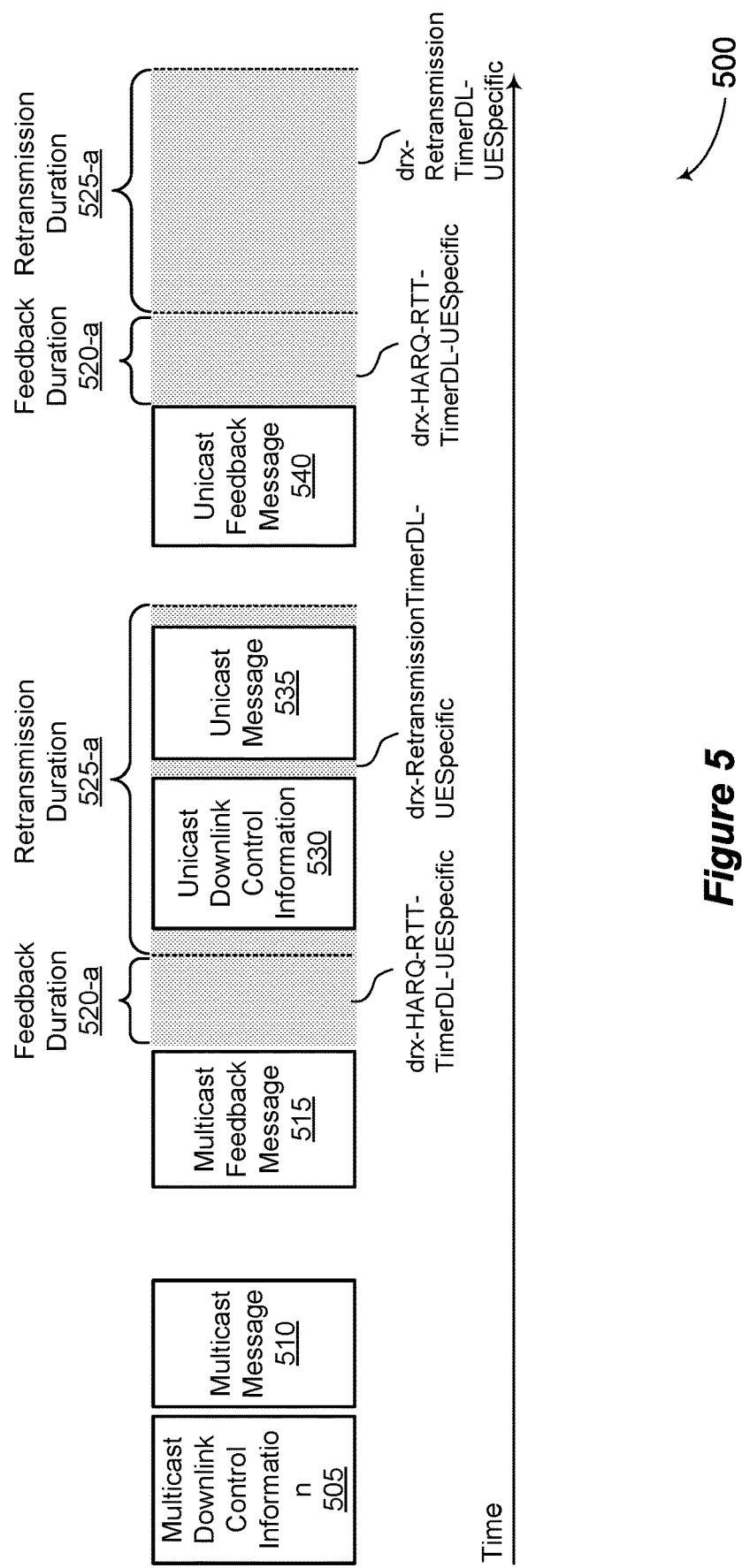

FIG. 5 illustrates an example of a timeline 500 that supports a DRX operation for NR multicast communications in accordance with aspects of the present disclosure. In some examples, the timeline 500 may also implement aspects of the wireless communications system 100 and 200, as described with reference to FIGS. 1 and 2. For example, the timeline 500 may be based on a configuration by a base station 105 or a UE 115, and implemented by the UE 115. The timeline 500 in the example of FIG. 5 may be illustrative of a timeline for when the UE 115 is configured with DRX operation capability for unicast communications and multicast communications in 5G systems.

The timeline 500, for example, may include one or more of a unicast active duration and a unicast inactive duration of a unicast DRX cycle. The timeline 500 may, additionally or alternatively, include one or more of a multicast active duration and a multicast inactive duration of a multicast DRX cycle. One or more of the unicast DRX cycle and the multicast DRX cycle may correspond to time and frequency resources. For example, one or more of the unicast DRX cycle and the multicast DRX cycle may correspond to a number of subframe cycles, with each subframe in a cycle having a subframe index ranging from 0 to 9. Each subframe cycle or subframe index or both may relate to one or more symbols and subcarriers, one or more slots and subcarriers, among other examples.

With reference to FIGS. 1 and 2, and in accordance with the timeline 500, a UE 115 may receive, from a base station 105, a multicast downlink control information 505. For example, the UE 115 may receive, from the base station 105, the multicast downlink control information 505 (for example, on a multicast PDCCH) in a multicast active duration of a multicast DRX cycle. The multicast downlink control information 505 may carry an indication of a resource allocation associated with a downlink data channel (for example, a PDSCH) for a multicast message 510 for the UE 115, which may be one of a group of UEs 115 that are subscribed to a multicast service or multiple multicast services. The UE 115 may transmit a multicast feedback message 515, in accordance with the timeline 500, to the base station 105 based on monitoring, for example, a reception of the multicast message 510, or a failure to receive the multicast message 510.

In some examples, the UE 115 may determine a timer configuration associated with one or more of a UE-specific timer configuration or a group-specific timer configuration (also referred to as a G-RNTI specific timer configuration). The UE-specific timer configuration may correspond to one or more of a multicast feedback timer and a multicast retransmission timer corresponding to a specific UE 115. The group-specific timer configuration may be applicable among the group of UEs 115 that are subscribed to the multicast service or multiple multicast services. The group-specific timer configuration may correspond to one or more of a multicast feedback timer and a multicast retransmission timer, both of which may be used by the group of UEs 115 that are subscribed to the multicast service or the multiple multicast services.

In the example of FIG. 5, the UE 115 may initiate a multicast feedback timer based on a UE-specific timer configuration (for example, when a retransmission of the multicast message 510 is configured to be sent via unicast transmission). The UE 115 may use the UE-specific timer configuration based on the multicast feedback message 515 being a negative acknowledgement due to a failure to receive the multicast message 510. In some examples, as a result of the failure to receive the multicast message 510, the base station 105 may transmit a retransmission of the multicast message 510. In some examples, the retransmission of the multicast message 510 may be in a unicast message (for example, a unicast message 535). The UE 115 may operate in accordance with the UE-specific timer configuration when the retransmission of the multicast message 510 is configured to be transmitted via a unicast transmission (for example, the unicast message 535).

The multicast feedback timer may correspond to a feedback duration 520-a, which may span one or more symbols, slots, subframes, among other examples. In some examples, the multicast feedback timer may be different than a unicast feedback timer associated with unicast messages for the UE 115. In some examples, the UE 115 may initiate the multicast feedback timer after the UE 115 transmits the multicast feedback message 515. The UE 115 may initiate the multicast retransmission timer following the multicast feedback timer (for example, following the feedback duration 520-a).

The multicast retransmission timer may correspond to a retransmission duration 525-a, which may span one or more symbols, slots, subframes, among other examples. In some examples, the multicast retransmission timer may be different than a unicast retransmission timer associated with unicast messages. In some examples, the UE 115 may initiate the multicast retransmission timer based on the multicast feedback message 515 and based on the feedback duration 520-a lapsing (that is, the multicast feedback timer expiring). For example, the UE 115 may initiate the multicast retransmission timer when the multicast feedback message 515 is a negative acknowledgement (in other words, when the multicast feedback message 515 indicates a failure to receive the multicast message 510). Otherwise, the UE 115 may refrain from initiating the multicast retransmission timer when the multicast feedback message 515 is a positive acknowledgement, due to a successful reception of the multicast message 510.

In some examples, over the retransmission duration 525-a, the UE 115 may receive, from the base station 105, a unicast downlink control information 530. For example, the UE 115 may receive, from the base station 105, the unicast downlink control information 530 (for example, on a unicast PDCCH) in a unicast active duration of a unicast DRX cycle. The unicast downlink control information 530 may carry an indication of a resource allocation associated with a downlink data channel (for example, a PDSCH) for the unicast message 535 for the UE 115. The UE 115 may receive a retransmission of the multicast message 510 via the unicast message 535 during the retransmission duration 525-a. The UE 115 may transmit a unicast feedback message 540, in accordance with the timeline 500, to the base station 105 based on monitoring, for example, a reception of the unicast message 535, or a failure to receive the unicast message 535. The UE 115 may repeat the above operations of initiating one or more timers according to the UE-specific timer configuration. The UE 115 may be configured to receive retransmissions via unicast or multicast and apply the corresponding timers accordingly.

Figure 6:
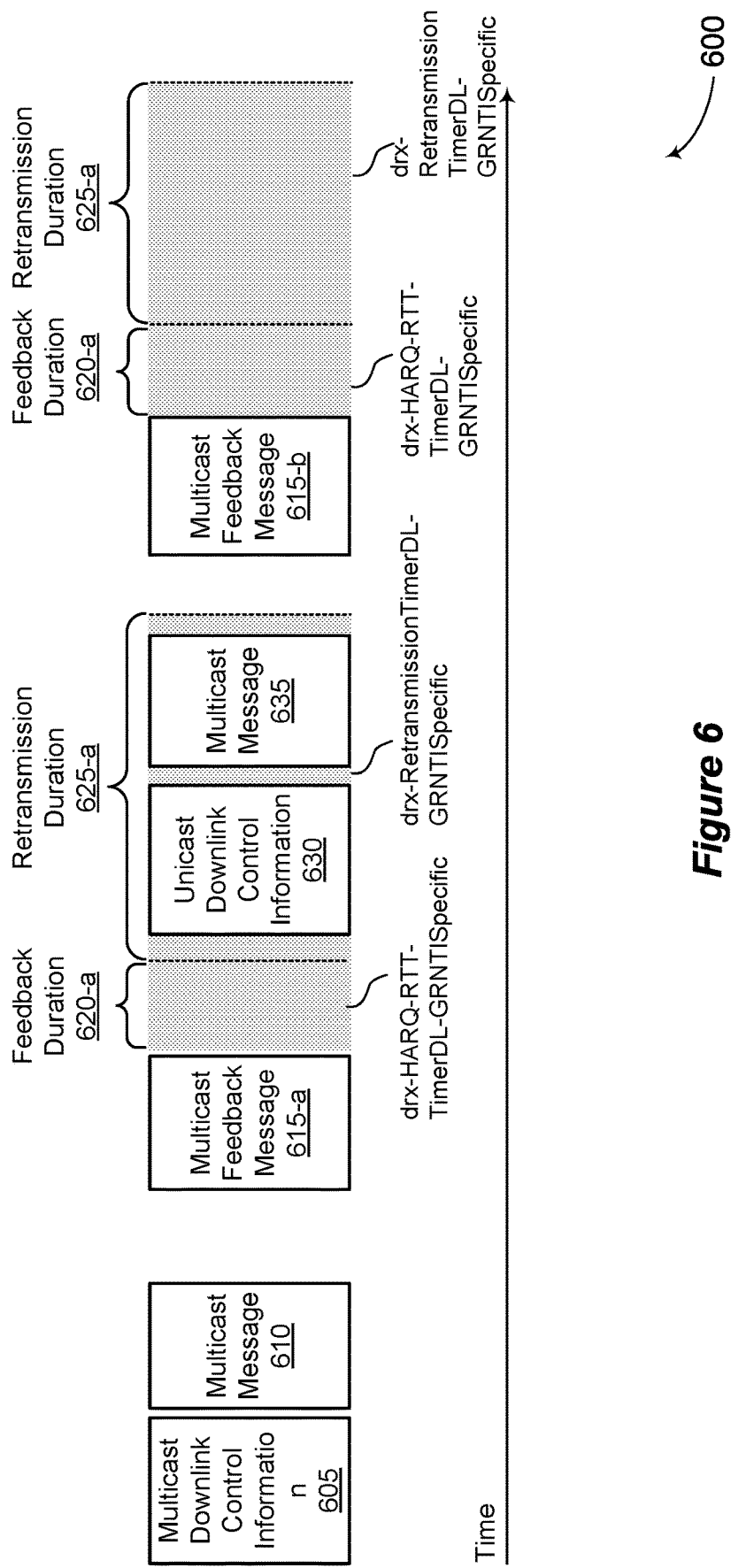

FIG. 6 illustrates an example of a timeline 600 that supports a DRX operation for NR multicast communications in accordance with aspects of the present disclosure. In some examples, the timeline 600 may also implement aspects of the wireless communications system 100 and 200, as described with reference to FIGS. 1 and 2. For example, the timeline 600 may be based on a configuration by a base station 105 or a UE 115, and implemented by the UE 115. The timeline 600 in the example of FIG. 6 may be illustrative of a timeline for when the UE 115 is configured with DRX operation capability for unicast communications and multicast communications in 5G systems.

The timeline 600, for example, may include one or more of a unicast active duration and a unicast inactive duration of a unicast DRX cycle. The timeline 600 may, additionally or alternatively, include one or more of a multicast active duration and a multicast inactive duration of a multicast DRX cycle. One or more of the unicast DRX cycle and the multicast DRX cycle may correspond to time and frequency resources. For example, one or more of the unicast DRX cycle and the multicast DRX cycle may correspond to a number of subframe cycles, with each subframe in a cycle having a subframe index ranging from 0 to 9. Each subframe cycle or subframe index or both may relate to one or more symbols and subcarriers, one or more slots and subcarriers, among other examples.

With reference to FIGS. 1 and 2, and in accordance with the timeline 600, a UE 115 may receive, from a base station 105, a multicast downlink control information 605. For example, the UE 115 may receive, from the base station 105, the multicast downlink control information 605 (for example, on a multicast PDCCH) in a multicast active duration of a multicast DRX cycle. The multicast downlink control information 605 may carry an indication of a resource allocation associated with a downlink data channel (for example, a PDSCH) for a multicast message 610 for the UE 115, which may be one of a group of UEs 115 that are subscribed to a multicast service or multiple multicast services. The UE 115 may transmit a multicast feedback message 615-a, in accordance with the timeline 600, to the base station 105 based on monitoring (for example, a reception of the multicast message 610, or a failure to receive the multicast message 610).

In some examples, the UE 115 may determine a timer configuration associated with one or more of a UE-specific timer configuration or a group-specific timer configuration (also referred to as a G-RNTI specific timer configuration). The UE-specific timer configuration may correspond to one or more of a multicast feedback timer and a multicast retransmission timer corresponding to a specific UE 115. The group-specific timer configuration may be applicable among a group of UEs 115 that are subscribed to the multicast service or multiple multicast services. The group-specific timer configuration may correspond to one or more of a multicast feedback timer and a multicast retransmission timer, both of which may be used by the group of UEs 115 that are subscribed to the multicast service or the multiple multicast services.

In the example of FIG. 6, the UE 115 may initiate a multicast feedback timer based on a group-specific timer configuration (for example, when a retransmission of the multicast message 610 is configured to be sent via multicast transmission). The UE 115 may use the group-specific timer configuration based on the multicast feedback message 615-a being a negative acknowledgement due to a failure to receive the multicast message 610. In some examples, due to the failure to receive the multicast message 610, the base station 105 may transmit a retransmission of the multicast message 610. In some examples, the retransmission of the multicast message 610 may be in a multicast message (for example, a multicast message 635). The UE 115 may operate in accordance with the group-specific timer configuration when the retransmission of the multicast message 610 is configured to be transmitted via a multicast transmission (for example, the multicast message 635).

The multicast feedback timer may correspond to a feedback duration 620-a, which may span one or more symbols, slots, subframes, among other examples. In some examples, the multicast feedback timer may be different than a unicast feedback timer associated with unicast messages for the UE 115. In some examples, the UE 115 may initiate the multicast feedback timer after the UE 115 transmits the multicast feedback message 615-a. The UE 115 may initiate the multicast retransmission timer following the multicast feedback timer (for example, following the feedback duration 620-a).

The multicast retransmission timer may correspond to a retransmission duration 625-a, which may span one or more symbols, slots, subframes, among other examples. In some examples, the multicast retransmission timer may be different than a unicast retransmission timer associated with unicast messages. In some examples, the UE 115 may initiate the multicast retransmission timer based on the multicast feedback message 615-a and based on the feedback duration 620-a lapsing (that is, the multicast feedback timer expiring). For example, the UE 115 may initiate the multicast retransmission timer when the multicast feedback message 615-a is a negative acknowledgement (in other words, when the multicast feedback message 615-a indicates a failure to receive the multicast message 610). Otherwise, the UE 115 may refrain from initiating the multicast retransmission timer when the multicast feedback message 615-a is a positive acknowledgement, due to a successful reception of the multicast message 610.

In some examples, over the retransmission duration 625-a, the UE 115 may receive, from the base station 105, a unicast downlink control information 630. For example, the UE 115 may receive, from the base station 105, the unicast downlink control information 630 (for example, on a unicast PDCCH) in a unicast active duration of a unicast DRX cycle. The unicast downlink control information 630 may carry an indication of a resource allocation associated with a downlink data channel (for example, a PDSCH) for the multicast message 635 for the UE 115. The UE 115 may receive a retransmission of the multicast message 610 via the multicast message 635 during the retransmission duration 625-a. The UE 115 may transmit a multicast feedback message 615-b, in accordance with the timeline 600, to the base station 105 based on monitoring, for example, a reception of the multicast message 635, or a failure to receive the multicast message 635. The UE 115 may repeat the above operations of initiating one or more timers according to the group-specific timer configuration. The UE 115 may be configured to receive retransmission via unicast or multicast and apply the corresponding timers accordingly.

Figure 7:
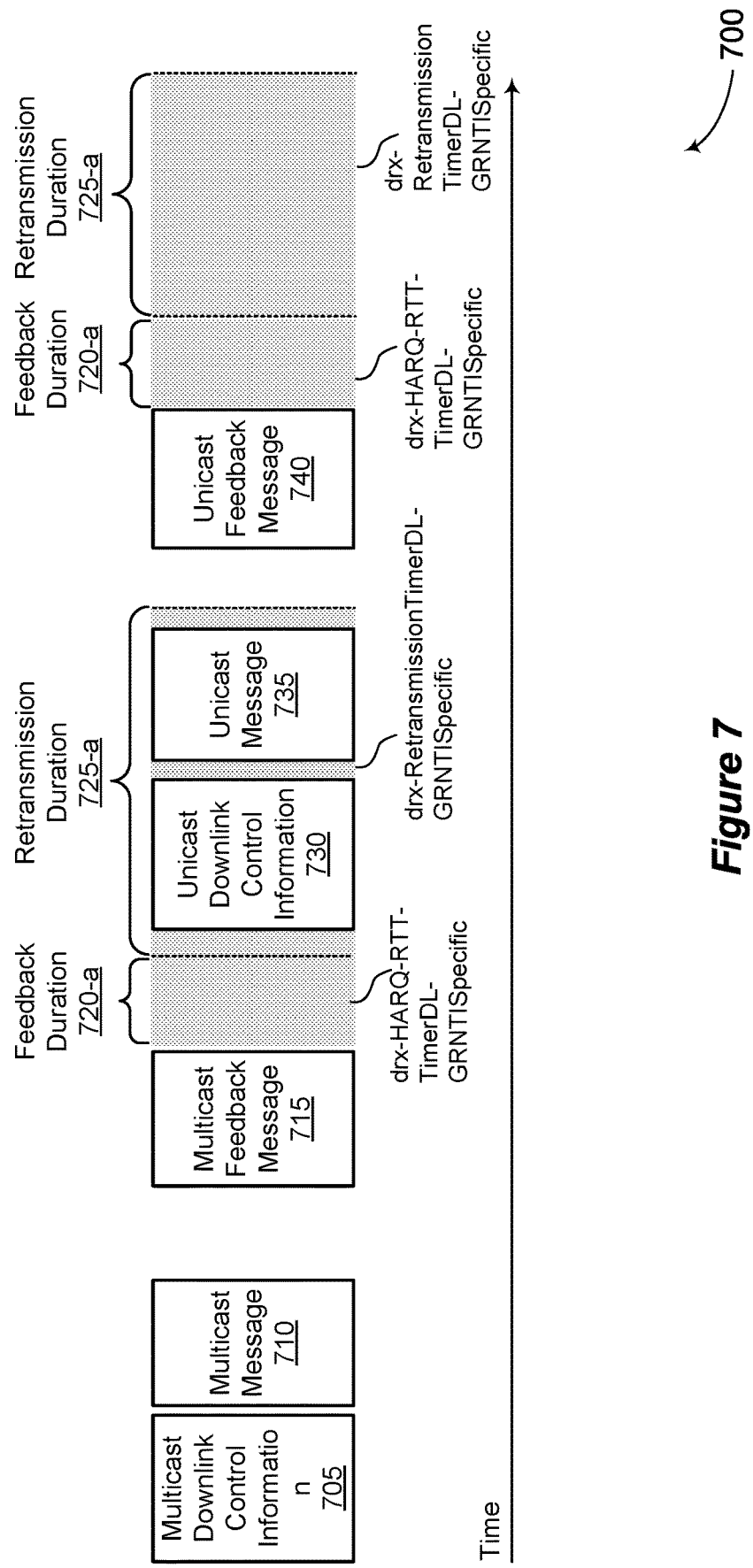

FIG. 7 illustrates an example of a timeline 700 that supports a DRX operation for NR multicast communications in accordance with aspects of the present disclosure. In some examples, the timeline 700 may also implement aspects of the wireless communications system 100 and 200, as described with reference to FIGS. 1 and 2. For example, the timeline 700 may be based on a configuration by a base station 105 or a UE 115, and implemented by the UE 115. The timeline 700 in the example of FIG. 7 may be illustrative of a timeline for when the UE 115 is configured with DRX operation capability for unicast communications and multicast communications in 5G systems.

The timeline 700, for example, may include one or more of a unicast active duration and a unicast inactive duration of a unicast DRX cycle. The timeline 700 may, additionally or alternatively, include one or more of a multicast active duration and a multicast inactive duration of a multicast DRX cycle. One or more of the unicast DRX cycle and the multicast DRX cycle may correspond to time and frequency resources. For example, one or more of the unicast DRX cycle and the multicast DRX cycle may correspond to a number of subframe cycles, with each subframe in a cycle having a subframe index ranging from 0 to 9. Each subframe cycle or subframe index or both may relate to one or more symbols and subcarriers, one or more slots and subcarriers, among other examples.

With reference to FIGS. 1 and 2, and in accordance with the timeline 700, a UE 115 may receive, from a base station 105, a multicast downlink control information 705. For example, the UE 115 may receive, from the base station 105, the multicast downlink control information 705 (for example, on a multicast PDCCH) in a multicast active duration of a multicast DRX cycle. The multicast downlink control information 705 may carry an indication of a resource allocation associated with a downlink data channel (for example, a PDSCH) for a multicast message 710 for the UE 115, which may be one of a group of UEs 115 that are subscribed to a multicast service or multiple multicast services. The UE 115 may transmit a multicast feedback message 715-a, in accordance with the timeline 700, to the base station 105 based on monitoring (for example, a reception of the multicast message 710, or a failure to receive the multicast message 710).

In some examples, the UE 115 may determine a timer configuration associated with one or more of a UE-specific timer configuration or a group-specific timer configuration (also referred to as a G-RNTI specific timer configuration). The UE-specific timer configuration may correspond to one or more of a multicast feedback timer and a multicast retransmission timer corresponding to a specific UE 115. The group-specific timer configuration may be applicable among a group of UEs 115 that are subscribed to the multicast service or the multiple multicast services. The group-specific timer configuration may correspond to one or more of a multicast feedback timer and a multicast retransmission timer, both of which may be used by the group of UEs 115 that are subscribed to the multicast service or the multiple multicast services.

In the example of FIG. 7, the UE 115 may initiate a multicast feedback timer based on a group-specific timer configuration (irrespective of whether a retransmission of the multicast message 710 is configured to be sent via unicast transmission or multicast transmission). The UE 115 may use the group-specific timer configuration based on the multicast feedback message 715 being a negative acknowledgement due to a failure to receive the multicast message 710. In some examples, due to the failure to receive the multicast message 710, the base station 105 may transmit a retransmission of the multicast message 710. In some examples, the retransmission of the multicast message 710 may be in a unicast message (for example, a unicast message 735).

The multicast feedback timer may correspond to a feedback duration 720-a, which may span one or more symbols, slots, subframes, among other examples. In some examples, the multicast feedback timer may be different than a unicast feedback timer associated with unicast messages for the UE 115. In some examples, the UE 115 may initiate the multicast feedback timer after the UE 115 transmits the multicast feedback message 715. The UE 115 may initiate the multicast retransmission timer following the multicast feedback timer (for example, following the feedback duration 720-a).

The multicast retransmission timer may correspond to a retransmission duration 725-a, which may span one or more symbols, slots, subframes, among other examples. In some examples, the multicast retransmission timer may be different than a unicast retransmission timer associated with unicast messages. In some examples, the UE 115 may initiate the multicast retransmission timer based on the multicast feedback message 715 and based on the feedback duration 720-a lapsing (that is, the multicast feedback timer expiring). For example, the UE 115 may initiate the multicast retransmission timer when the multicast feedback message 715 is a negative acknowledgement (in other words, when the multicast feedback message 715 indicates a failure to receive the multicast message 710). Otherwise, the UE 115 may refrain from initiating the multicast retransmission timer when the multicast feedback message 715 is a positive acknowledgement, due to a successful reception of the multicast message 710.

In some examples, over the retransmission duration 725-a, the UE 115 may receive, from the base station 105, a unicast downlink control information 730. For example, the UE 115 may receive, from the base station 105, the unicast downlink control information 730 (for example, on a unicast PDCCH) in a unicast active duration of a unicast DRX cycle. The unicast downlink control information 730 may carry an indication of a resource allocation associated with a downlink data channel (for example, a PDSCH) for the unicast message 735 for the UE 115. The UE 115 may receive a retransmission of the multicast message 710 via the unicast message 735 during the retransmission duration 725-a. The UE 115 may transmit a unicast feedback message 740, in accordance with the timeline 700, to the base station 105 based on monitoring, for example, a reception of the unicast message 735, or a failure to receive the unicast message 735. The UE 115 may repeat the above operations of initiating one or more timers according to the group-specific timer configuration, for example, the UE 115 may initiate a unicast feedback timer corresponding to a feedback duration 720-a, as well as a unicast retransmission timer corresponding to the retransmission duration 725-a, based on a failure to receive the unicast message 735. The UE 115 may be configured to receive retransmission via unicast and apply the corresponding group-specific timers accordingly.

Figure 8:
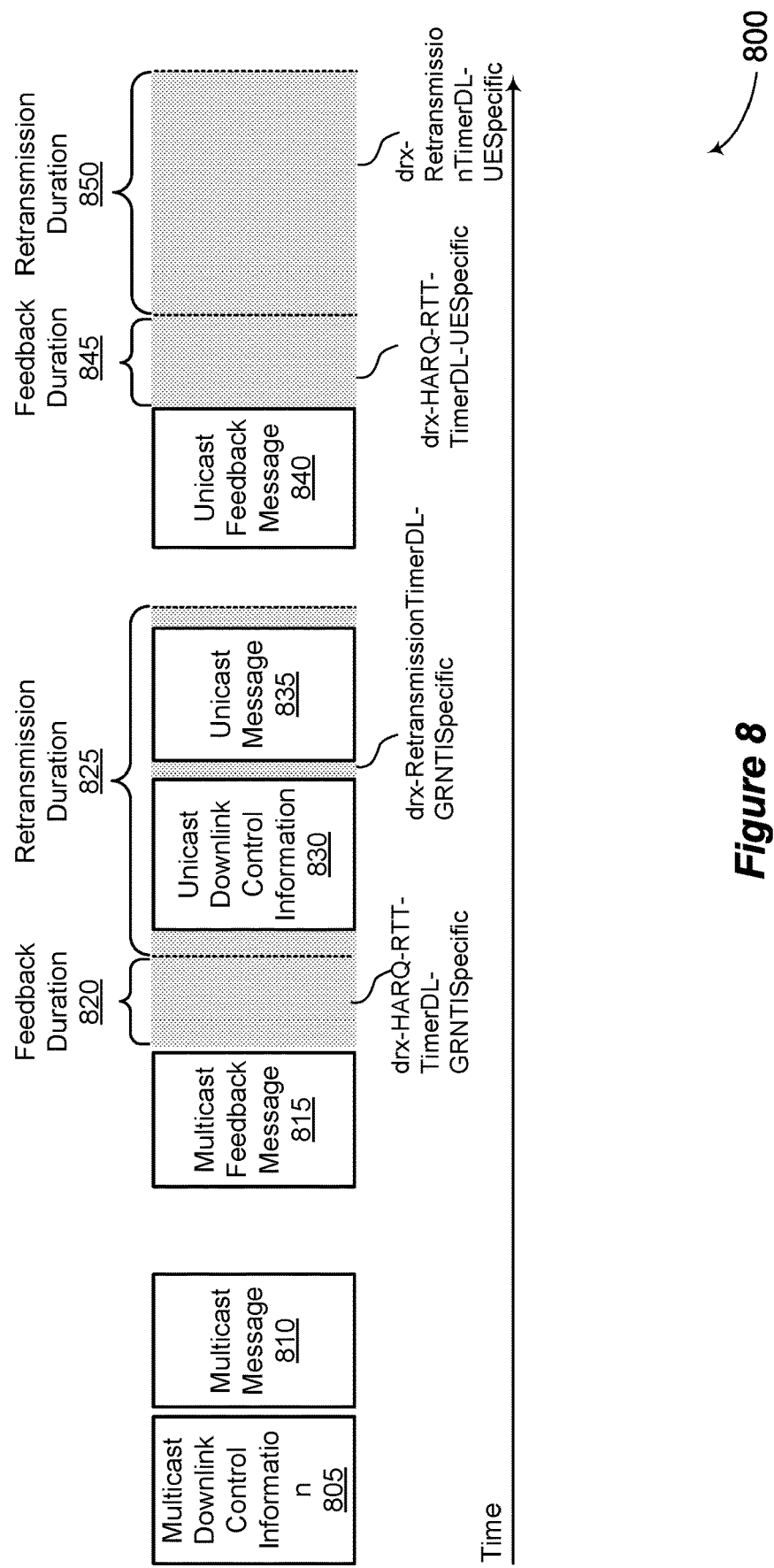

FIG. 8 illustrates an example of a timeline 800 that supports a DRX operation for NR multicast communications in accordance with aspects of the present disclosure. In some examples, the timeline 800 may also implement aspects of the wireless communications system 100 and 200, as described with reference to FIGS. 1 and 2. For example, the timeline 800 may be based on a configuration by a base station 105 or a UE 115, and implemented by the UE 115. In some examples, the timeline 800, in the example of FIG. 8, may be illustrative of a timeline for when the UE 115 is configured with DRX operation capability for unicast communications and multicast communications in 5G systems.

The timeline 800, for example, may include one or more of a unicast active duration and a unicast inactive duration of a unicast DRX cycle. The timeline 800 may, additionally or alternatively, include one or more of a multicast active duration and a multicast inactive duration of a multicast DRX cycle. One or more of the unicast DRX cycle and the multicast DRX cycle may correspond to time and frequency resources. For example, one or more of the unicast DRX cycle and the multicast DRX cycle may correspond to a number of subframe cycles, with each subframe in a cycle having a subframe index ranging from 0 to 9. Each subframe cycle or subframe index or both may relate to one or more symbols and subcarriers, one or more slots and subcarriers, among other examples.

With reference to FIGS. 1 and 2, and in accordance with the timeline 800, a UE 115 may receive, from a base station 105, a multicast downlink control information 805. For example, the UE 115 may receive, from the base station 105, the multicast downlink control information 805 (for example, on a multicast PDCCH) in a multicast active duration of a multicast DRX cycle. The multicast downlink control information 805 may carry an indication of a resource allocation associated with a downlink data channel (for example, a PDSCH) for a multicast message 810 for the UE 115, which may belong to a group of UEs 115. The UE 115 may transmit a multicast feedback message 815, in accordance with the timeline 800, to the base station 105 based on monitoring (for example, a reception of the multicast message 810, or a failure to receive the multicast message 810).

In some examples, the UE 115 may determine a timer configuration associated with one or more of a UE-specific timer configuration or a group-specific timer configuration (also referred to as a G-RNTI specific timer configuration). The UE-specific timer configuration may correspond to one or more of a multicast feedback timer and a multicast retransmission timer corresponding to a specific UE 115. The group-specific timer configuration may be applicable among a group of UEs 115, including the UE 115, that are subscribed to a multicast service or multiple multicast services. The group-specific timer configuration may correspond to one or more of a multicast feedback timer and a multicast retransmission timer, both of which may be used by the group of UEs 115 that are subscribed to the multicast service or the multiple multicast services.

In the example of FIG. 8, the UE 115 may initiate a multicast feedback timer based on a group-specific timer configuration (based on receiving the multicast downlink control information 805 or the multicast message 810 via multicast communications). In other words, the UE 115 may operate according to the group-specific timer configuration depending on whether the current transmission (for example, (based the multicast downlink control information 805 or the multicast message 810) is transmitted via multicast or unicast. In some examples, the UE 115 may use the group-specific timer configuration based on the multicast feedback message 815 being a negative acknowledgement due to a failure to receive the multicast message 810. In some examples, due to the failure to receive the multicast message 810, the base station 105 may transmit a retransmission of the multicast message 810. In some examples, the retransmission of the multicast message 810 may be in a unicast message (for example, a unicast message 835).

The multicast feedback timer may correspond to a feedback duration 820, which may span one or more symbols, slots, subframes, among other examples. In some examples, the multicast feedback timer may be different than a unicast feedback timer associated with unicast messages for the UE 115. In some examples, the UE 115 may initiate the multicast feedback timer after the UE 115 transmits the multicast feedback message 815. The UE 115 may initiate the multicast retransmission timer following the multicast feedback timer (for example, following the feedback duration 820).

The multicast retransmission timer may correspond to a retransmission duration 825, which may span one or more symbols, slots, subframes, among other examples. In some examples, the multicast retransmission timer may be different than a unicast retransmission timer associated with unicast messages. In some examples, the UE 115 may initiate the multicast retransmission timer depending on the multicast feedback message 815 and the feedback duration 820 lapsing (that is, the multicast feedback timer expiring). For example, the UE 115 may initiate the multicast retransmission timer when the multicast feedback message 815 is a negative acknowledgement. In other words, a failure to receive the multicast message 810. Otherwise, the UE 115 may refrain from initiating the multicast retransmission timer when the multicast feedback message 815 is a positive acknowledgement, due to a successful reception of the multicast message 810.

In some examples, over the retransmission duration 825, the UE 115 may receive, from the base station 105, a unicast downlink control information 830. For example, the UE 115 may receive, from the base station 105, the unicast downlink control information 830 (for example, on a unicast PDCCH) in a unicast active duration of a unicast DRX cycle. The unicast downlink control information 830 may carry an indication of a resource allocation associated with a downlink data channel (for example, a PDSCH) for the unicast message 835 for the UE 115. The UE 115 may receive a retransmission of the multicast message 810 via the unicast message 835 during the retransmission duration 825.

The UE 115 may transmit a unicast feedback message 840, in accordance with the timeline 800, to the base station 105 based on monitoring (for example, a reception of the unicast message 835, or a failure to receive the unicast message 835). The UE 115 may repeat the above operations of initiating one or more timers according to a UE-specific timer configuration, for example, the UE 115 may initiate a unicast feedback timer corresponding to a feedback duration 845, as well as a unicast retransmission timer corresponding to a duration 850, based on a failure to receive the unicast message 835. In the example of FIG. 8, the UE 115 may initiate a unicast feedback timer based on a UE-specific timer configuration (based on receiving the unicast downlink control information 830 or the unicast message 835 via unicast). In other words, the UE 115 may operate according to the UE-specific timer configuration depending on whether the current transmission (for example, (based the unicast downlink control information 830 or the unicast message 835) is transmitted via unicast. The UE 115 may be configured to receive operate according to multiple timer configurations. For example, in accordance with the timeline 800, the UE 115 may use both a group-specific timer configuration and a UE-specific configuration depending on the actual transmission and retransmission.

Returning to FIG. 2, in some examples, the UE 115-a may be unable to support parallel monitoring or reception of unicast messages and multicast messages (for example, multicast message 215). The UE 115-a may have to prioritize unicast operation or multicast operations. The base station 105-a may configure the UE 115-a with a priority level for unicast operation and a priority level for multicast operation. An example timeline prioritizing unicast operation or multicast operations is described with reference to FIG. 9.

Figure 9:
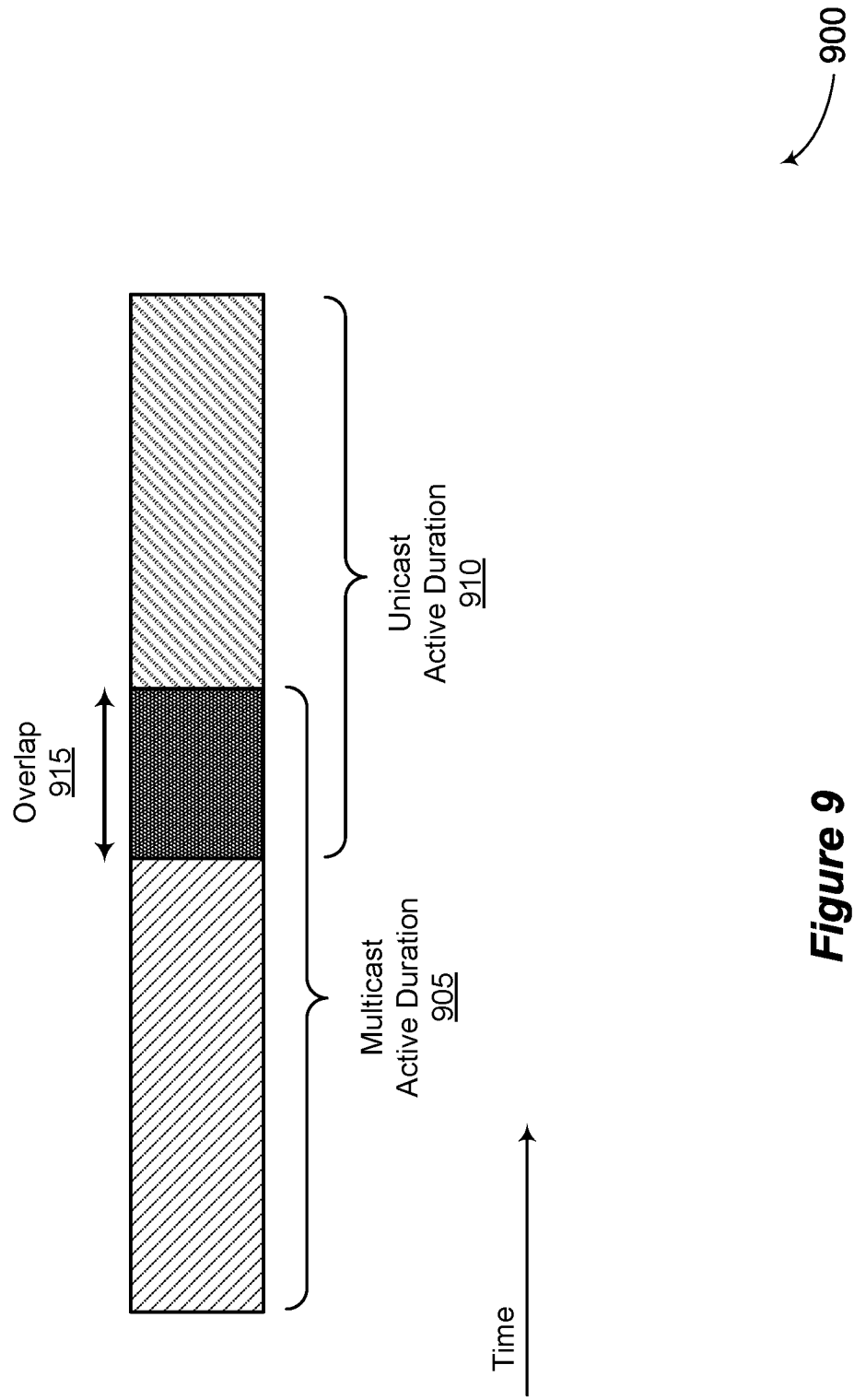

FIG. 9 illustrates an example of a timeline 900 that supports a DRX operation for NR multicast communications in accordance with aspects of the present disclosure. In some examples, the timeline 900 may also implement aspects of the wireless communications system 100 and 200, as described with reference to FIGS. 1 and 2. For example, the timeline 900 may be based on a configuration by a base station 105 or a UE 115, and implemented by the UE 115. In some examples, the timeline 900, in the example of FIG. 9, may be illustrative of a timeline for when the UE 115 is configured with DRX operation capability for unicast communications and multicast communications in 5G systems.

The timeline 900 may, for example, include one or more of a multicast active duration 905 and a multicast inactive duration (not shown) of a multicast DRX cycle. The timeline 900 may, additionally or alternatively, may include one or more of a unicast active duration 910 and a unicast inactive duration (not shown) of a unicast DRX cycle. One or more of the unicast DRX cycle and the multicast DRX cycle may correspond to time and frequency resources. For example, one or more of the unicast DRX cycle and the multicast DRX cycle may correspond to a number of subframe cycles, with each subframe in a cycle having a subframe index ranging from 0 to 9. Each subframe cycle or subframe index or both may relate to one or more symbols and subcarriers, one or more slots and subcarriers, among other examples.

With reference to FIGS. 1 and 2, and in accordance with the timeline 900, a UE 115 may determine the multicast active duration 905 of a multicast DRX cycle based on a multicast operation, and determine the unicast active duration 910 of a unicast DRX cycle based on a unicast operation. In some examples, the UE 115 may determine a portion of the multicast active duration 905 overlaps a portion of the unicast active duration 910. The UE 115 may determine to monitor the multicast active duration 905 or the unicast active duration 910 based on a comparison of a priority level of the unicast operation with a priority level of the multicast operation.

When the UE 115 is configured with DRX operations for both unicast and multicast, the UE may support the prioritization exclusively for the overlap 915 (active time region). The active time region includes ON duration, inactivity timer or retransmission timer running. In some examples, when unicast is in active time while multicast is not in active time, the UE 115 may monitor unicast, irrespective of the priority between unicast and multicast. For example, the UE 115 may determine a unicast inactive duration (not shown) of the unicast DRX cycle based on a unicast operation, and determine the multicast active duration 905 of the multicast DRX cycle based on a multicast operation. The UE 115 may monitor the multicast active duration 905 of the multicast DRX cycle based on the unicast inactive duration of the unicast DRX cycle. Alternatively, when multicast is in active time while unicast is not in active time, the UE 115 may monitor multicast, irrespective of the priority between unicast and multicast. For example, the UE 115 may determine a multicast inactive duration (not shown) of the multicast DRX cycle based on a multicast operation, and determine the unicast active duration 910 of the unicast DRX cycle based on a unicast operation. The UE 115 may monitor the unicast active duration 910 of the unicast DRX cycle based on the multicast inactive duration of the multicast DRX cycle. In some examples, when both unicast and multicast are in the active time, the prioritization may apply when unicast and multicast control resource sets or scheduling collides.

Returning to FIG. 2, in some examples, when the UE 115-a cannot support parallel monitoring or reception of unicast and multicast, the UE 115-a may truncate an active time to avoid overlapping between unicast and multicast regions. The base station 105-a may configure non-overlapping active durations for unicast and multicast to avoid parallel unicast and multicast. In some examples, the base station 105-a may configure the UE 115 to stop a unicast inactivity timer, a unicast feedback timer and a unicast retransmission timer when one or more of the unicast inactivity timer, the unicast feedback timer and the unicast retransmission timer overlap with multicast active durations. Alternatively, the base station 105-a may configure the UE 115 to stop a multicast inactivity timer, a multicast feedback timer and a multicast retransmission timer when one or more of the multicast inactivity timer, the multicast feedback timer and the multicast retransmission timer overlap with unicast active durations. In some examples, the base station 105-a may configure for the UE 115 to stop a multicast active timer when it overlaps with unicast active durations. Here, unicast timers may continue to count when they overlap with multicast active durations. Alternatively, the base station 105-a may configure for the UE 115 to stop a unicast active timer when it overlaps with multicast active durations. Here, multicast timers continue to count when they overlap with unicast active durations.

Figure 10:
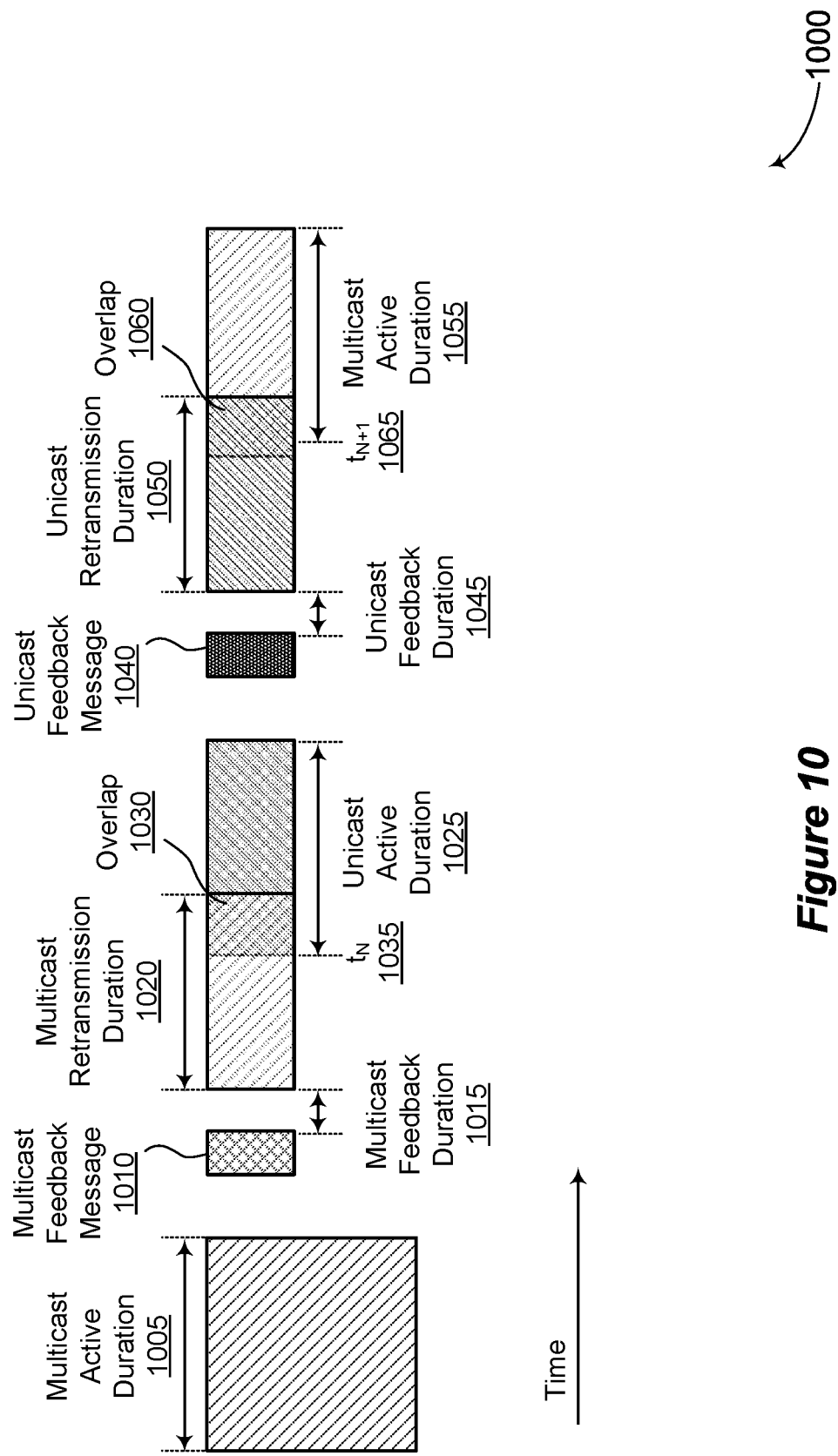

FIG. 10 illustrates an example of a timeline 1000 that supports a DRX operation for NR multicast communications in accordance with aspects of the present disclosure. In some examples, the timeline 1000 may also implement aspects of the wireless communications system 100 and 200, as described with reference to FIGS. 1 and 2. For example, the timeline 1000 may be based on a configuration by a base station 105 or a UE 115, and implemented by the UE 115. In some examples, the timeline 1000, in the example of FIG. 10, may be illustrative of a timeline for when the UE 115 is configured with DRX operation capability for unicast communications and multicast communications in 5G systems.

The timeline 1000, for example, may include one or more of a unicast active duration and a unicast inactive duration of a unicast DRX cycle. The timeline 1000 may, additionally or alternatively, include one or more of a multicast active duration and a multicast inactive duration of a multicast DRX cycle. One or more of the unicast DRX cycle and the multicast DRX cycle may correspond to time and frequency resources. For example, one or more of the unicast DRX cycle and the multicast DRX cycle may correspond to a number of subframe cycles, with each subframe in a cycle having a subframe index ranging from 0 to 9. Each subframe cycle or subframe index or both may relate to one or more symbols and subcarriers, one or more slots and subcarriers, among other examples.

With reference to FIGS. 1 and 2, and in accordance with the timeline 1000, a UE 115 may receive, from a base station 105, a multicast downlink control information. For example, the UE 115 may receive, from the base station 105, the multicast downlink control information (for example, on a multicast PDCCH) in a multicast active duration 1005 of a multicast DRX cycle. The multicast downlink control information may carry an indication of a resource allocation associated with a downlink data channel (for example, a PDSCH) for a multicast message for the UE 115, which may belong to a group of UEs 115. For example, the UE 115 may receive, from the base station 105, the multicast message in the multicast active duration 1005.

In some examples, the UE 115 may transmit a multicast feedback message 1010, in accordance with the timeline 1000, to the base station 105 based on monitoring (for example, a reception of the multicast message in the multicast active duration 1005, or a failure to receive the multicast message in the multicast active duration 1005). In the example of FIG. 10, the UE 115 may initiate a multicast feedback timer (for example, a multicast HARQ RTT timer) following the multicast feedback message 1010 transmission based on, for example, a group-specific timer configuration or a UE-specific timer configuration, as described herein. The multicast feedback timer may correspond to a multicast feedback duration 1015 (for example, of the multicast HARQ RTT timer), which may span one or more symbols, slots, subframes, among other examples. In some examples, the multicast feedback timer may be different than a unicast feedback timer associated with unicast messages for the UE 115.

The UE 115 may, in some examples, initiate a multicast retransmission timer following the multicast feedback timer (for example, following the multicast feedback duration 1015). The multicast retransmission timer may correspond to a multicast retransmission duration 1020, which may span one or more symbols, slots, subframes, among other examples. In some examples, a unicast active duration 1025 of a unicast DRX cycle for the UE 115 may have an overlap 1030 (for example, a partial overlap in a time domain) with a portion of the multicast retransmission duration 1020. In some examples, when the UE 115 cannot support parallel monitoring or reception of unicast and multicast, the UE 115 may terminate (for example, truncate) active timers to avoid an overlap between unicast and multicast regions. For example, the UE 115 may terminate the multicast retransmission timer at a time instance $t_n$ 1035 (for example, when the unicast active duration 1025 begins), which may correspond to a symbol, a slot, a subframe, among other examples. The UE 115 may terminate the multicast retransmission timer associated with a multicast operation based on a portion of the multicast retransmission duration 1020 overlapping with a portion of the unicast active duration 1025 of the unicast DRX cycle.

In some examples, the UE 115 may transmit a unicast feedback message 1040, in accordance with the timeline 1000, to the base station 105 based on monitoring (for example, a reception of a unicast message in the unicast active duration 1025, or a failure to receive the multicast message in the unicast active duration 1025). The unicast message may carry a retransmission of a multicast message that the UE 115 failed to receive in the multicast active duration 1005 or in the multicast retransmission duration 1020, or both. In the example of FIG. 10, the UE 115 may initiate a unicast feedback timer (for example, a unicast HARQ RTT timer) following the unicast feedback message 1040 transmission based on, for example, a group-specific timer configuration or a UE-specific timer configuration, as described herein. The unicast feedback timer may correspond to a unicast feedback duration 1045 (for example, of the unicast HARQ RTT timer), which may span one or more symbols, slots, subframes, among other examples. In some examples, the unicast feedback timer may be different than a multicast feedback timer associated with multicast messages for the UE 115.

The UE 115 may, in some examples, initiate a unicast retransmission timer following the unicast feedback timer (for example, following the unicast feedback duration 1045). The unicast retransmission timer may correspond to a unicast retransmission duration 1050, which may span one or more symbols, slots, subframes, among other examples. In some examples, a multicast active duration 1055 of a multicast DRX cycle for the UE 115 may have an overlap 1060 (for example, a partial overlap in a time domain) with a portion of the unicast retransmission duration 1050. In some examples, when the UE 115 cannot support concurrent monitoring or reception of unicast and multicast, the UE 115 may terminate (for example, truncate) active timers to avoid an overlap between unicast and multicast regions. For example, the UE 115 may terminate the unicast retransmission timer at a time instance $t_{n+1}$ 1065 (for example, when the multicast active duration 1055 begins), which may correspond to a symbol, a slot, a subframe, among other examples. The UE 115 may terminate the unicast retransmission timer associated with a unicast operation based on a portion of the unicast retransmission duration 1050 overlapping with a portion of the multicast active duration 1055 of the multicast DRX cycle.

Figure 11:
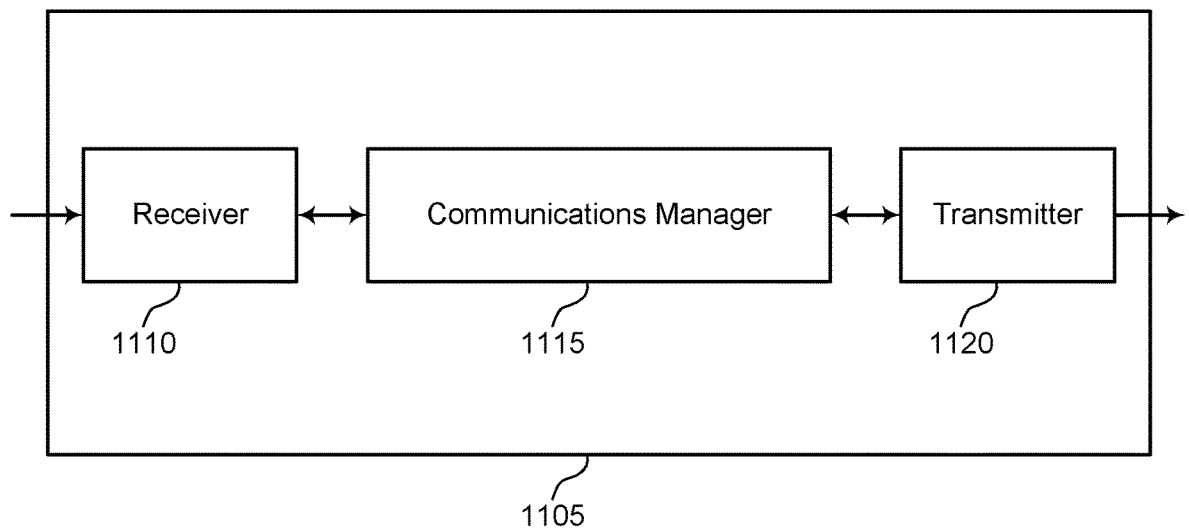
FIGS. 11 and 12 show block diagrams of devices that support DRX operation for NR multicast communications in accordance with aspects of the present disclosure.

FIG. 11 shows a block diagram of a device 1105 that supports a DRX operation for NR multicast communications in accordance with aspects of the present disclosure. The device 1105 may be an example of aspects of a UE 115 as described herein. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to DRX operation for NR multicast communications). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, in an active duration of a multicast DRX cycle, downlink control information indicating resources of a downlink data channel for a multicast message for a set of UEs, including the device 1105, monitor the indicated resources for the multicast message, transmit, based on the monitoring the indicated resources, a feedback message corresponding to the multicast message, and initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the device 1105. The communications manager 1115 may be an example of aspects of the communications manager 1410 described herein.

The communications manager 1115, or its sub-components, may be implemented in hardware, code (for example, software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1115, or its sub-components, may be physically located at different locations, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
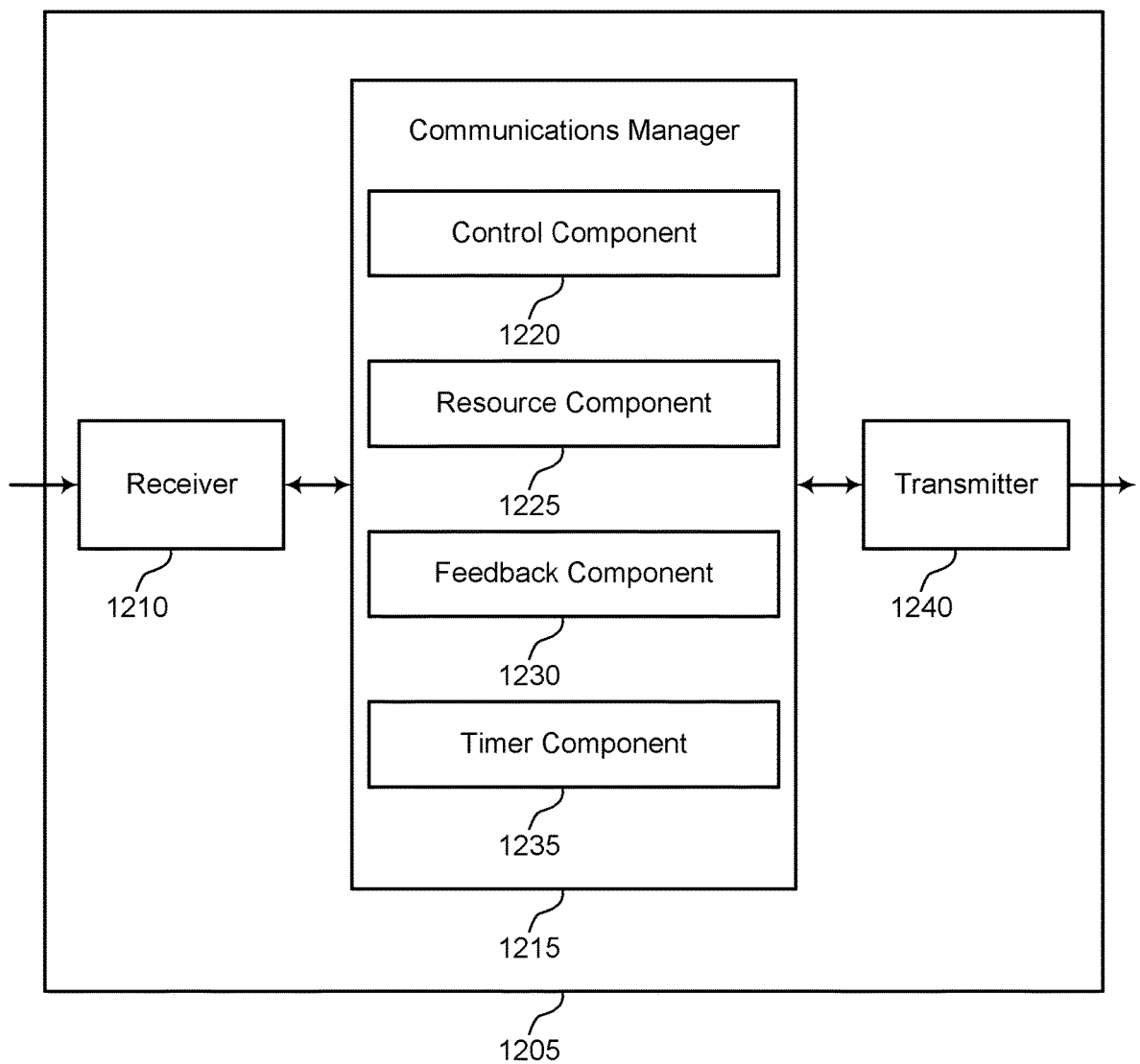

FIG. 12 shows a block diagram of a device 1205 that supports a DRX operation for NR multicast communications in accordance with aspects of the present disclosure. The device 1205 may be an example of aspects of a device 1105, or a UE 115 as described herein. The device 1205 may include a receiver 1210, a communications manager 1215, and a transmitter 1240. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to DRX operation for NR multicast communications). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control component 1220, a resource component 1225, a feedback component 1230, and a timer component 1235. The communications manager 1215 may be an example of aspects of the communications manager 1410 described herein.

The control component 1220 may receive, in an active duration of a multicast DRX cycle, downlink control information indicating resources of a downlink data channel for a multicast message for a set of UEs, including the device 1205. The resource component 1225 may monitor the indicated resources for the multicast message. The feedback component 1230 may transmit, based on the monitoring the indicated resources, a feedback message corresponding to the multicast message. The timer component 1235 may initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the device 1205.

The transmitter 1240 may transmit signals generated by other components of the device 1205. In some examples, the transmitter 1240 may be collocated with a receiver 1210 in a transceiver component. For example, the transmitter 1240 may be an example of aspects of the transceiver 1420 described with reference to FIG. 14. The transmitter 1240 may utilize a single antenna or a set of antennas.

Figure 13:
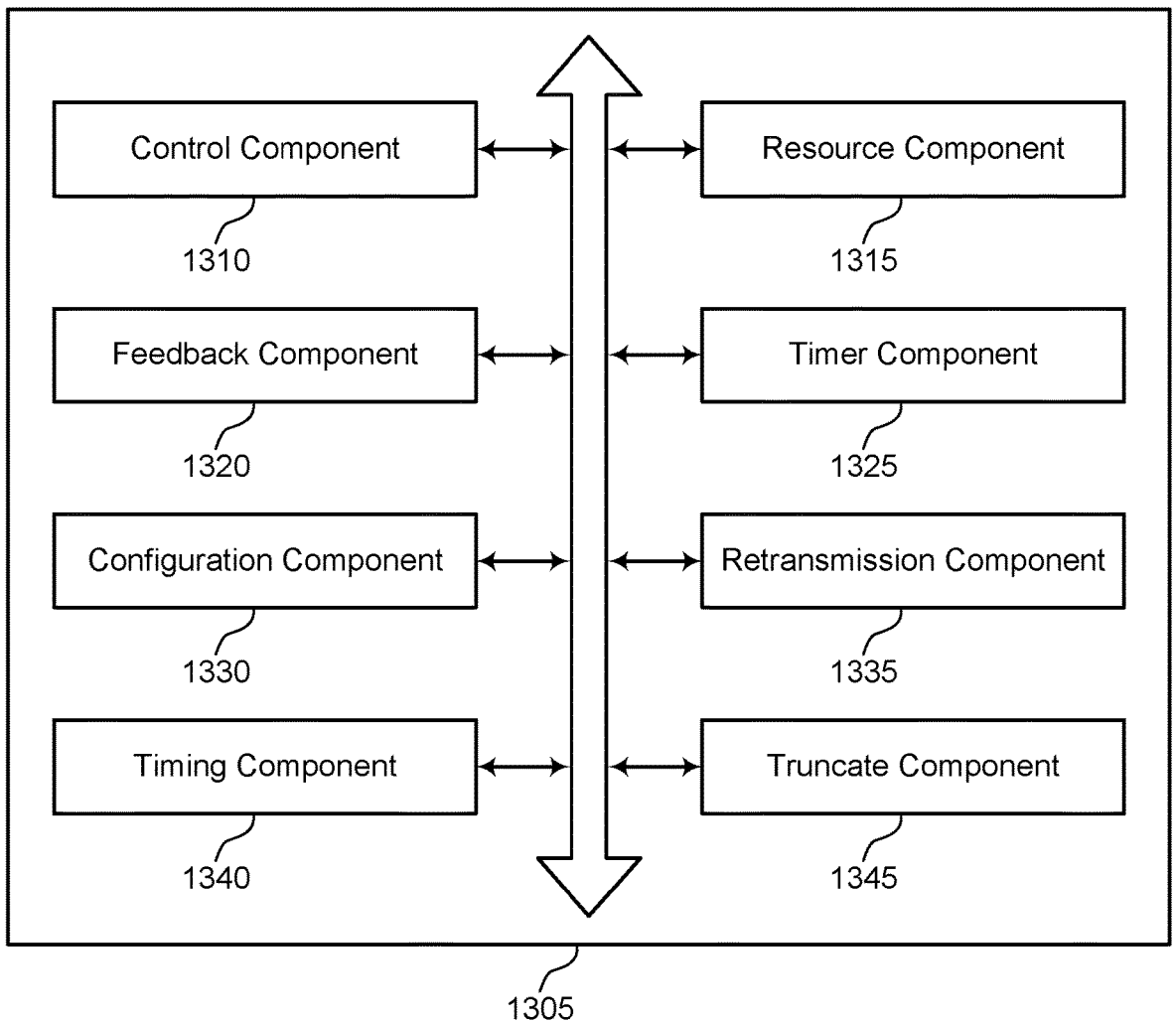
FIG. 13 shows a block diagram of a communications manager that supports DRX operation for NR multicast communications in accordance with aspects of the present disclosure.

FIG. 13 shows a block diagram of a communications manager 1305 that supports a DRX operation for NR multicast communications in accordance with aspects of the present disclosure. The communications manager 1305 may be an example of aspects of a communications manager 1115, a communications manager 1215, or a communications manager 1410 described herein. The communications manager 1305 may include a control component 1310, a resource component 1315, a feedback component 1320, a timer component 1325, a configuration component 1330, a retransmission component 1335, a timing component 1340, and a truncate component 1345. Each of these components may communicate, directly or indirectly, with one another (for example, via one or more buses).

The control component 1310 may receive, in an active duration of a multicast DRX cycle, downlink control information indicating resources of a downlink data channel for a multicast message for a set of UEs, including the UE. In some examples, the control component 1310 may receive, in a second active duration of the multicast DRX cycle, the downlink control information indicating the resources of the downlink data channel for the multicast message for the set of UEs, including the UE. In some cases, the downlink data channel includes a physical downlink shared channel.

The resource component 1315 may monitor the indicated resources for the multicast message. In some examples, the resource component 1315 may transmit the feedback message over a transmission time interval associated with the UE and on the resources of the UE-specific resources, the transmission time interval corresponds to a set of transmission time intervals associated with the set of UEs including the UE. In some examples, the resource component 1315 may determine a resource allocation related to the feedback message, the resource allocation including common resources. In some examples, the resource component 1315 may determine a resource allocation related to the feedback message, the resource allocation including UE-specific resources.

In some cases, the resource component 1315 may determine a resource allocation related to the feedback message, the resource allocation including common resources associated with the set of UEs, including the UE. In some examples, transmitting the feedback message includes transmitting the feedback message on resources of the common resources. In some cases, the set of UEs relate to a multicast service. In some cases, one or more of a duration of the multicast feedback timer or a duration of a multicast retransmission timer associated with the UE of the set of UEs is aligned with one or more of a duration of a different multicast feedback timer or a duration of a different multicast retransmission timer associated with a different UE of the set of UEs. In some cases, the resource component 1315 may determine a resource allocation related to the feedback message, the resource allocation including UE-specific resources associated with the UE. In some examples, transmitting the feedback message includes transmitting the feedback message on resources of the UE-specific resources.

The feedback component 1320 may transmit, based on the monitoring the indicated resources, a feedback message corresponding to the multicast message. The timer component 1325 may initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the UE. In some examples, the timer component 1325 may initiate a multicast retransmission timer following the multicast feedback timer, the multicast retransmission timer indicating a time duration for the monitoring for the retransmission of the multicast message, where the multicast retransmission timer is different than a unicast retransmission timer associated with the unicast messages. In some examples, the timer component 1325 may initiate a multicast retransmission timer following the multicast feedback timer, the multicast retransmission timer indicating a time duration for the monitoring for the retransmission of the multicast message, the multicast retransmission timer having a same value as a unicast retransmission timer associated with the unicast messages.

In some examples, the timer component 1325 may initiate the multicast feedback timer after one or more of receiving the downlink control information on a downlink control channel or receiving the downlink data channel for the multicast message. In some examples, the timer component 1325 may initiate a multicast retransmission timer following the multicast feedback timer based on an ending of the multicast feedback timer. In some examples, the timer component 1325 may initiate the multicast feedback timer after transmitting the feedback message based on the resource allocation including the common resources. In some examples, the timer component 1325 may initiate, based on the resource allocation, the multicast feedback timer after one or more of receiving the downlink control information on a downlink control channel or receiving the downlink data channel for the multicast message.

The configuration component 1330 may receive a timer configuration corresponding to a multicast service associated with the multicast message. In some examples, initiating the multicast feedback timer is based on the timer configuration. In some examples, the configuration component 1330 may receive the timer configuration via a multicast control channel. In some examples, the configuration component 1330 may receive the timer configuration via UE-specific signaling. In some examples, the configuration component 1330 may determine one or more of a duration of the multicast feedback timer or a duration of the multicast retransmission timer based on the multicast service associated with the multicast message. In some cases, the timer configuration includes one or more of an indication of a duration of the multicast feedback timer or a duration of a multicast retransmission timer. In some cases, the timer configuration includes a G-RNTI, and one or more of the multicast feedback timer or the multicast retransmission timer correspond to the G-RNTI. In some cases, the feedback message includes a negative acknowledgement. In some examples, initiating the multicast retransmission timer following the multicast feedback timer is based on the negative acknowledgement.

The retransmission component 1335 may receive a retransmission of the multicast message in the second active duration of the multicast DRX cycle. In some examples, the retransmission includes a unicast message for the UE. In some examples, the retransmission component 1335 may monitor, in an active duration of a unicast DRX cycle, the downlink control information indicating the resources of the downlink data channel for the multicast message for the set of UEs, including the UE. In some examples, the retransmission component 1335 may determine that the retransmission of the multicast message includes a unicast transmission. In some examples, the retransmission component 1335 may initiate one or more of the unicast feedback timer or a unicast retransmission timer based on the unicast transmission. In some examples, the retransmission component 1335 may determine that the retransmission of the multicast message includes a multicast transmission. In some examples, the retransmission component 1335 may initiate one or more of the multicast feedback timer or a multicast retransmission timer based on the multicast transmission.

The timing component 1340 may determine an active duration of a unicast DRX cycle based on a unicast operation. In some examples, the timing component 1340 may determine an inactive duration of the multicast DRX cycle based on a multicast operation. In some examples, the timing component 1340 may monitor the active duration of the unicast DRX cycle based on the inactive duration of the multicast DRX cycle. In some examples, the timing component 1340 may determine an inactive duration of a unicast DRX cycle based on a unicast operation. In some examples, the timing component 1340 may determine the active duration of the multicast DRX cycle based on a multicast operation. In some examples, the timing component 1340 may monitor the active duration of the multicast DRX cycle based on the inactive duration of the unicast DRX cycle.

In some examples, the timing component 1340 may determine to monitor the active duration of the unicast DRX cycle or the active duration of the multicast DRX cycle based on a comparison of a priority level of the unicast operation with a priority level of the multicast operation. In some cases, a portion of the active duration of the unicast DRX cycle overlaps a portion of the inactive duration of the multicast DRX cycle. In some cases, a portion of the inactive unicast DRX duration overlaps a portion of the active duration of the multicast DRX cycle. In some cases, a portion of the active duration of the unicast DRX cycle overlaps a portion of the active duration of the multicast DRX cycle. In some cases, the priority level of the unicast operation or the priority level of the multicast operation is configured over the overlap.

The truncate component 1345 may terminate a timer associated with a unicast operation based on a duration of the timer overlapping with the active duration of the multicast DRX cycle. In some examples, the timer includes one or more of a unicast inactivity timer, the unicast feedback timer, or a unicast retransmission timer. In some examples, the truncate component 1345 may terminate a timer associated with a multicast operation based on a duration of the timer overlapping with an active duration of a unicast DRX cycle. In some examples, the timer includes one or more of a multicast inactivity timer, the multicast feedback timer, or a multicast retransmission timer.

Figure 14:
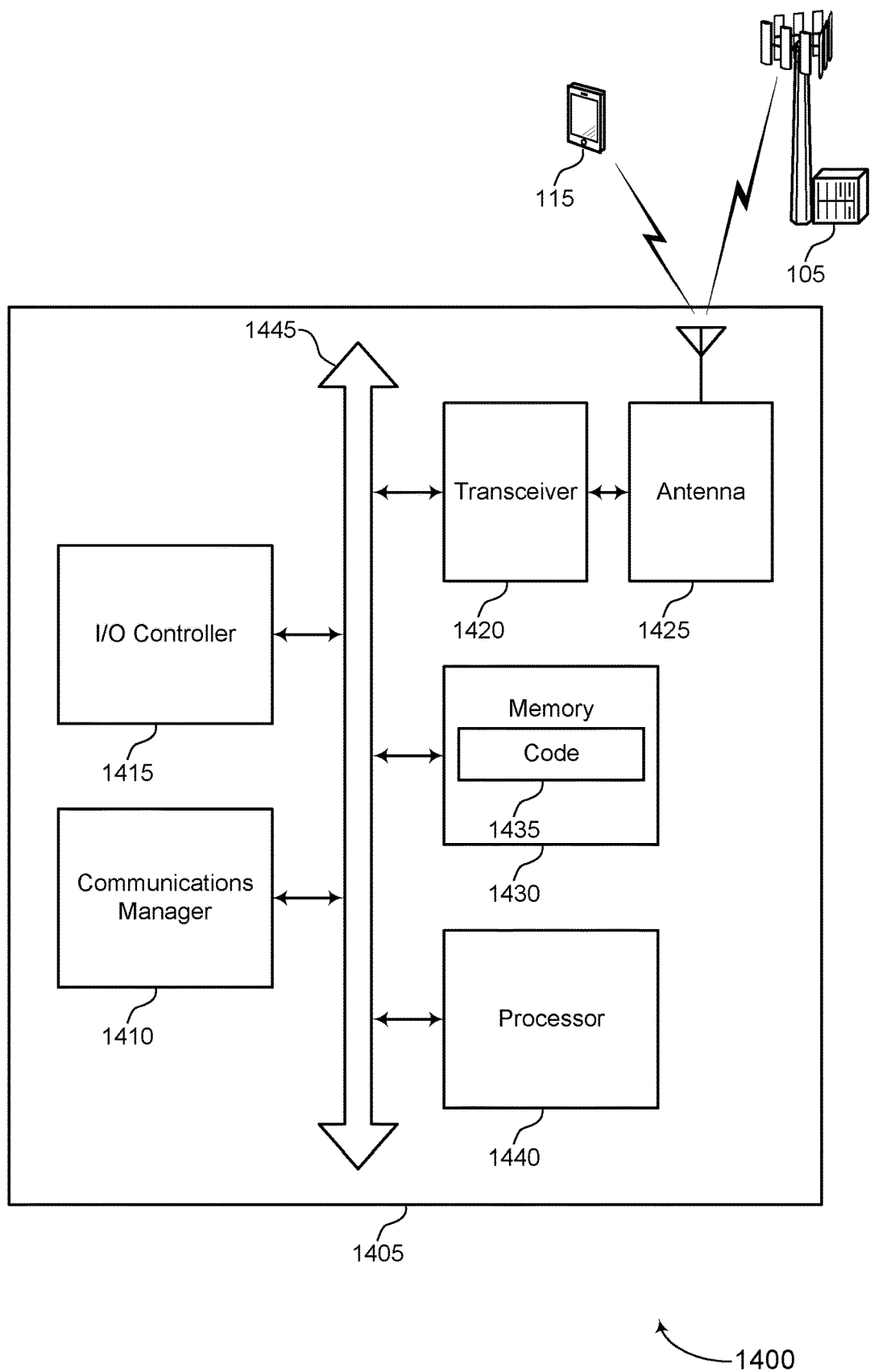
FIG. 14 shows a diagram of a system including a device that supports DRX operation for NR multicast communications in accordance with aspects of the present disclosure.

FIG. 14 shows a diagram of a system 1400 including a device 1405 that supports a DRX operation for NR multicast communications in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an input/output (I/O) controller 1415, a transceiver 1420, an antenna 1425, memory 1430, and a processor 1440. These components may be in electronic communication via one or more buses (for example, bus 1445).

The communications manager 1410 may receive, in an active duration of a multicast DRX cycle, downlink control information indicating resources of a downlink data channel for a multicast message for a set of UEs, including the device 1405, monitor the indicated resources for the multicast message, transmit, based on the monitoring the indicated resources, a feedback message corresponding to the multicast message, and initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the device 1405.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases the device 1405 may have more than one antenna 1425, which may be capable of concurrently transmitting or receiving multiple wireless transmissions.

The memory 1430 may include random access memory (RAM) and read only memory (ROM). The memory 1430 may store computer-readable, computer-executable code 1435 including instructions that, when executed, cause the processor to perform various functions described herein. In some cases, the memory 1430 may contain, among other things, a basic I/O system (BIOS) which may control basic hardware or software operation such as the interaction with peripheral components or devices.

The processor 1440 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (for example, the memory 1430) to cause the device 1405 to perform various functions (for example, functions or tasks supporting DRX operation for NR multicast communications).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (for example, when compiled and executed) to perform functions described herein.

Figure 15:
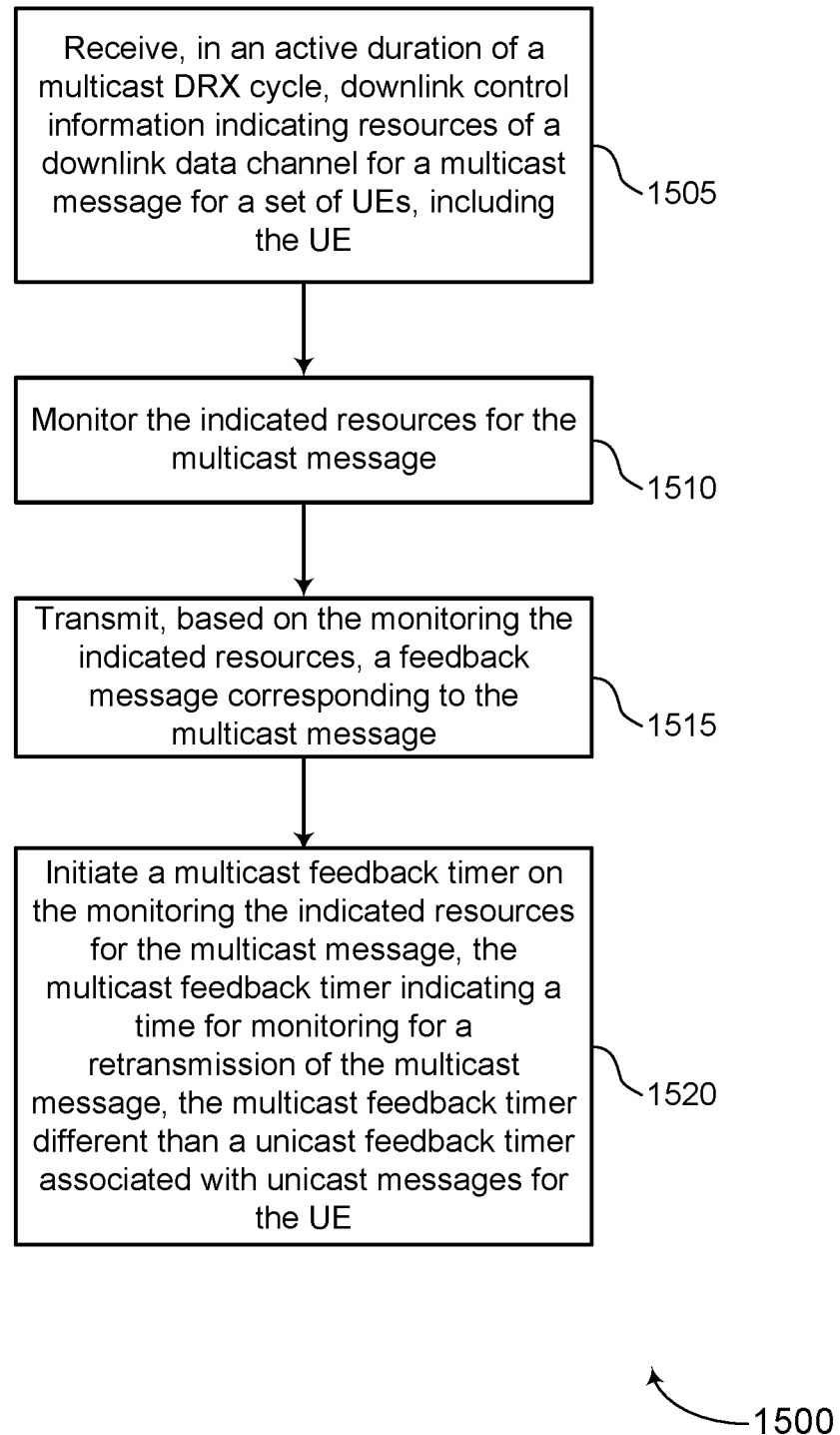
FIGS. 15-18 show flowcharts illustrating methods that support DRX operation for NR multicast communications in accordance with aspects of the present disclosure.

FIG. 15 shows a flowchart illustrating a method 1500 that supports a DRX operation for NR multicast communications in accordance with aspects of the present disclosure. The operations of method 1500 may be implemented by a UE 115 or its components as described herein. For example, the operations of method 1500 may be performed by a communications manager as described with reference to FIGS. 11-14. In some examples, a UE may execute a set of instructions to control the functional elements of the UE to perform the functions described below. Additionally or alternatively, a UE may perform aspects of the functions described below using special-purpose hardware.

At 1505, the UE may receive, in an active duration of a multicast DRX cycle, downlink control information indicating resources of a downlink data channel for a multicast message for a set of UEs, including the UE. The operations of 1505 may be performed according to the methods described herein. In some examples, aspects of the operations of 1505 may be performed by a control component as described with reference to FIGS. 11-14.

At 1510, the UE may monitor the indicated resources for the multicast message. The operations of 1510 may be performed according to the methods described herein. In some examples, aspects of the operations of 1510 may be performed by a resource component as described with reference to FIGS. 11-14.

At 1515, the UE may transmit, based on the monitoring the indicated resources, a feedback message corresponding to the multicast message. The operations of 1515 may be performed according to the methods described herein. In some examples, aspects of the operations of 1515 may be performed by a feedback component as described with reference to FIGS. 11-14.

At 1520, the UE may initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the UE. The operations of 1520 may be performed according to the methods described herein. In some examples, aspects of the operations of 1520 may be performed by a timer component as described with reference to FIGS. 11-14.

Figure 16:
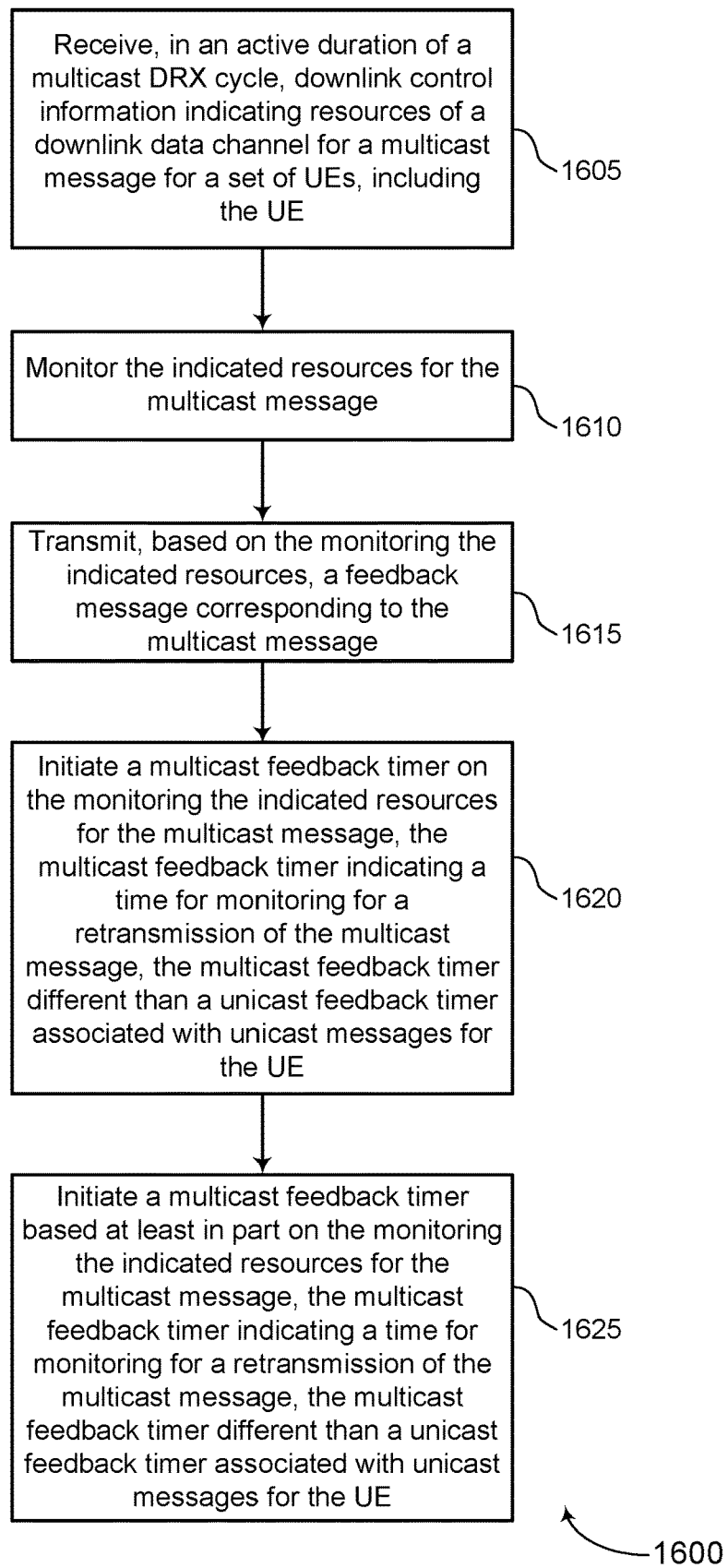

FIG. 16 shows a flowchart illustrating a method 1600 that supports a DRX operation for NR multicast communications in accordance with aspects of the present disclosure. The operations of method 1600 may be implemented by a UE 115 or its components as described herein. For example, the operations of method 1600 may be performed by a communications manager as described with reference to FIGS. 11-14. In some examples, a UE may execute a set of instructions to control the functional elements of the UE to perform the functions described below. Additionally or alternatively, a UE may perform aspects of the functions described below using special-purpose hardware.

At 1605, the UE may receive, in an active duration of a multicast DRX cycle, downlink control information indicating resources of a downlink data channel for a multicast message for a set of UEs, including the UE. The operations of 1605 may be performed according to the methods described herein. In some examples, aspects of the operations of 1605 may be performed by a control component as described with reference to FIGS. 11-14.

At 1610, the UE may monitor the indicated resources for the multicast message. The operations of 1610 may be performed according to the methods described herein. In some examples, aspects of the operations of 1610 may be performed by a resource component as described with reference to FIGS. 11-14.

At 1615, the UE may transmit, based on the monitoring the indicated resources, a feedback message corresponding to the multicast message. The operations of 1615 may be performed according to the methods described herein. In some examples, aspects of the operations of 1615 may be performed by a feedback component as described with reference to FIGS. 11-14.

At 1620, the UE may initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the UE. The operations of 1620 may be performed according to the methods described herein. In some examples, aspects of the operations of 1620 may be performed by a timer component as described with reference to FIGS. 11-14.

At 1625, the UE may initiate a multicast feedback timer based at least in part on the monitoring the indicated resources for the multicast message, the multicast feedback timer indicating a time for monitoring for a retransmission of the multicast message, the multicast feedback timer different than a unicast feedback timer associated with unicast messages for the UE. The operations of 1625 may be performed according to the methods described herein. In some examples, aspects of the operations of 1625 may be performed by a timer component as described with reference to FIGS. 11-14.

Figure 17:
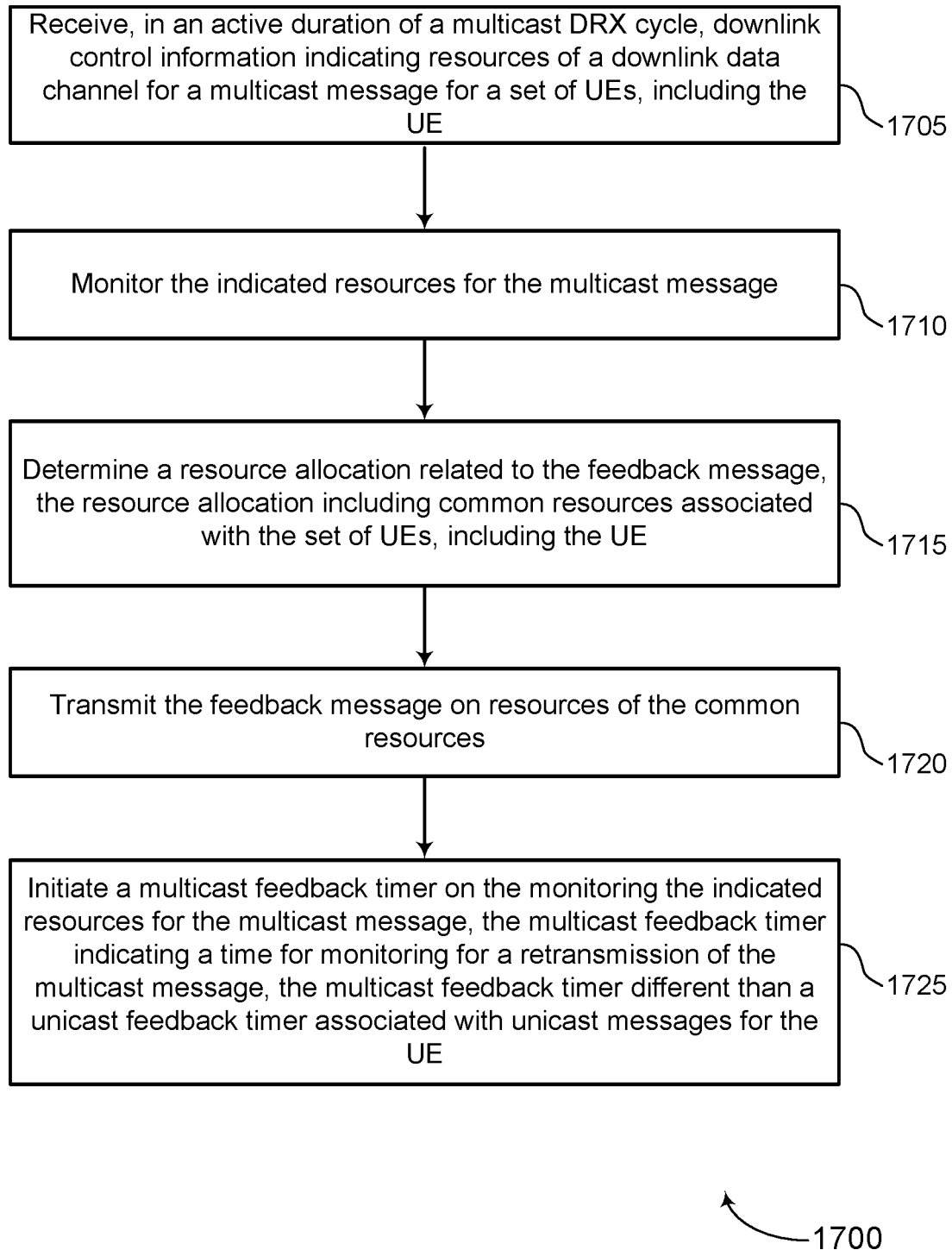

FIG. 17 shows a flowchart illustrating a method 1700 that supports a DRX operation for NR multicast communications in accordance with aspects of the present disclosure. The operations of method 1700 may be implemented by a UE 115 or its components as described herein. For example, the operations of method 1700 may be performed by a communications manager as described with reference to FIGS. 11-14. In some examples, a UE may execute a set of instructions to control the functional elements of the UE to perform the functions described below. Additionally or alternatively, a UE may perform aspects of the functions described below using special-purpose hardware.

At 1705, the UE may receive, in an active duration of a multicast DRX cycle, downlink control information indicating resources of a downlink data channel for a multicast message for a set of UEs, including the UE. The operations of 1705 may be performed according to the methods described herein. In some examples, aspects of the operations of 1705 may be performed by a control component as described with reference to FIGS. 11-14.

At 1710, the UE may monitor the indicated resources for the multicast message. The operations of 1710 may be performed according to the methods described herein. In some examples, aspects of the operations of 1710 may be performed by a resource component as described with reference to FIGS. 11-14.

At 1715, the UE may determine a resource allocation related to the feedback message, the resource allocation including common resources associated with the set of UEs, including the UE. The operations of 1715 may be performed according to the methods described herein. In some examples, aspects of the operations of 1715 may be performed by a resource component as described with reference to FIGS. 11-14.

At 1720, the UE may transmit the feedback message on resources of the common resources. The operations of 1720 may be performed according to the methods described herein. In some examples, aspects of the operations of 1720 may be performed by a feedback component as described with reference to FIGS. 11-14.

At 1725, the UE may initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the UE. The operations of 1725 may be performed according to the methods described herein. In some examples, aspects of the operations of 1725 may be performed by a timer component as described with reference to FIGS. 11-14.

Figure 18:
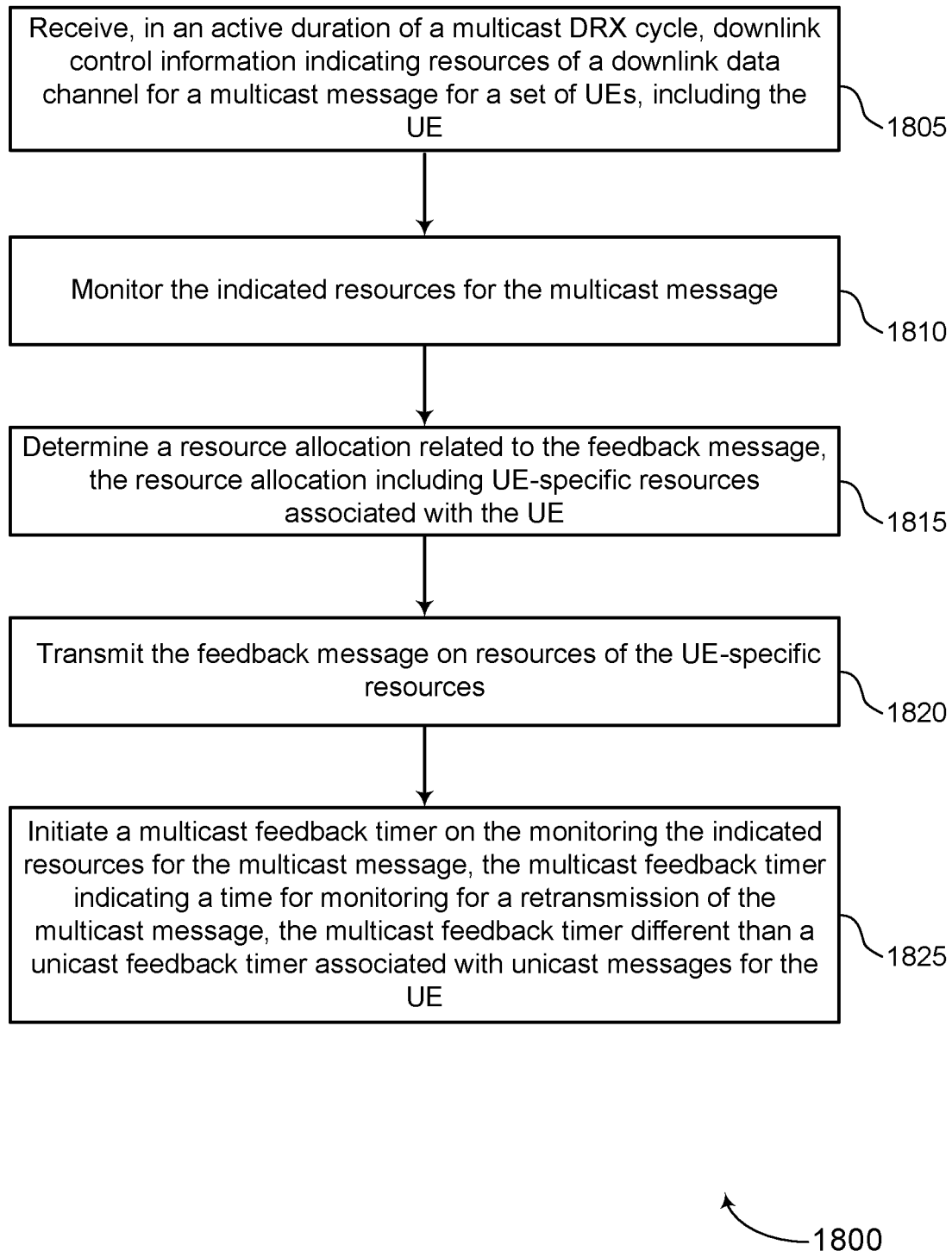

FIG. 18 shows a flowchart illustrating a method 1800 that supports a DRX operation for NR multicast communications in accordance with aspects of the present disclosure. The operations of method 1800 may be implemented by a UE 115 or its components as described herein. For example, the operations of method 1800 may be performed by a communications manager as described with reference to FIGS. 11-14. In some examples, a UE may execute a set of instructions to control the functional elements of the UE to perform the functions described below. Additionally or alternatively, a UE may perform aspects of the functions described below using special-purpose hardware.

At 1805, the UE may receive, in an active duration of a multicast DRX cycle, downlink control information indicating resources of a downlink data channel for a multicast message for a set of UEs, including the UE. The operations of 1805 may be performed according to the methods described herein. In some examples, aspects of the operations of 1805 may be performed by a control component as described with reference to FIGS. 11-14.

At 1810, the UE may monitor the indicated resources for the multicast message. The operations of 1810 may be performed according to the methods described herein. In some examples, aspects of the operations of 1810 may be performed by a resource component as described with reference to FIGS. 11-14.

At 1815, the UE may determine a resource allocation related to the feedback message, the resource allocation including UE-specific resources associated with the UE. The operations of 1815 may be performed according to the methods described herein. In some examples, aspects of the operations of 1815 may be performed by a resource component as described with reference to FIGS. 11-14.

At 1820, the UE may transmit a feedback message on resources of the UE-specific resources. The operations of 1820 may be performed according to the methods described herein. In some examples, aspects of the operations of 1820 may be performed by a feedback component as described with reference to FIGS. 11-14.

At 1825, the UE may initiate a multicast feedback timer based on the monitoring the indicated resources for the multicast message, the multicast feedback timer indicating a time for monitoring for a retransmission of the multicast message, the multicast feedback timer different than a unicast feedback timer associated with unicast messages for the UE. The operations of 1825 may be performed according to the methods described herein. In some examples, aspects of the operations of 1825 may be performed by a timer component as described with reference to FIGS. 11-14.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a user equipment (UE), comprising: receiving, in an active duration of a multicast discontinuous reception cycle, downlink control information indicating resources of a downlink data channel for a multicast message for a plurality of UEs, including the UE; monitoring the indicated resources for the multicast message; transmitting, based at least in part on the monitoring the indicated resources, a feedback message corresponding to the multicast message; and initiating a multicast feedback timer based at least in part on the monitoring for the multicast message, the multicast feedback timer different than a unicast feedback timer associated with unicast messages for the UE.

Aspect 2: The method of aspect 1, further comprising initiating a multicast retransmission timer following the multicast feedback timer, the multicast retransmission timer indicating a time duration for the monitoring for the retransmission of the multicast message, wherein the multicast retransmission timer is different than a unicast retransmission timer associated with the unicast messages.

Aspect 3: The method of any one of aspects 1 through 2, further comprising initiating a multicast retransmission timer following the multicast feedback timer, the multicast retransmission timer indicating a time duration for the monitoring for the retransmission of the multicast message, the multicast retransmission timer having a same value as a unicast retransmission timer associated with the unicast messages.

Aspect 4: The method of any one of aspects 1 through 3, further comprising receiving a timer configuration corresponding to a multicast service associated with the multicast message, wherein initiating the multicast feedback timer is based at least in part on the timer configuration.

Aspect 5: The method of aspect 4, wherein: receiving the timer configuration comprises receiving the timer configuration via a multicast control channel or UE-specific signaling, wherein the timer configuration comprises one or more of an indication of a duration of the multicast feedback timer or a duration of a multicast retransmission timer.

Aspect 6: The method of any one of aspects 1 through 5, wherein the downlink data channel comprises a physical downlink shared channel.

Aspect 7: The method of any one of aspects 1 through 6, further comprising determining a resource allocation related to the feedback message, the resource allocation comprising common resources associated with the plurality of UEs, including the UE, wherein transmitting the feedback message comprises transmitting the feedback message on resources of the common resources.

Aspect 8: The method of aspect 7, wherein one or more of a duration of the multicast feedback timer or a duration of a multicast retransmission timer associated with the UE of the plurality of UEs is aligned with one or more of a duration of a different multicast feedback timer or a duration of a different multicast retransmission timer associated with a different UE of the plurality of UEs.

Aspect 9: The method of any one of aspects 1 through 8, further comprising determining a resource allocation related to the feedback message, the resource allocation comprising UE-specific resources associated with the UE, wherein transmitting the feedback message comprises transmitting the feedback message on resources of the UE-specific resources.

Aspect 10: The method of aspect 9, further comprising transmitting the feedback message over a transmission time interval associated with the UE and on the resources of the UE-specific resources, wherein Aspect 11: The method of any one of aspects 1 through 10, wherein initiating the multicast feedback timer comprises: initiating the multicast feedback timer after one or more of receiving the downlink control information on a downlink control channel or receiving the downlink data channel for the multicast message; and initiating a multicast retransmission timer following the multicast feedback timer based at least in part on an ending of the multicast feedback timer.

Aspect 12: The method of any one of aspects 1 through 11, further comprising: determining a resource allocation related to the feedback message, the resource allocation comprising common resources; and initiating the multicast feedback timer after transmitting the feedback message based at least in part on the resource allocation comprising the common resources.

Aspect 13: The method of any one of aspects 1 through 12, further comprising: determining a resource allocation related to the feedback message, the resource allocation comprising UE-specific resources; and initiating, based at least in part on the resource allocation, the multicast feedback timer after one or more of receiving the downlink control information on a downlink control channel or receiving the downlink data channel for the multicast message.

Aspect 14: The method of any one of aspects 1 through 13, further comprising: receiving, in a second active duration of the multicast discontinuous reception cycle, the downlink control information indicating the resources of the downlink data channel for the multicast message for the plurality of UEs, including the UE; and receiving a retransmission of the multicast message in the second active duration of the multicast discontinuous reception cycle, wherein the retransmission comprises a unicast message for the UE.

Aspect 15: The method of aspect 14, further comprising monitoring, in an active duration of a unicast discontinuous reception cycle, for the downlink control information indicating the resources of the downlink data channel for the multicast message for the plurality of UEs, including the UE.

Aspect 16: The method of any one of aspects 14 through 15, further comprising: determining that the retransmission of the multicast message comprises a unicast transmission; and initiating one or more of the unicast feedback timer or a unicast retransmission timer based at least in part on the unicast transmission.

Aspect 17: The method of any one of aspects 14 through 16, further comprising: determining that the retransmission of the multicast message comprises a multicast transmission; and initiating one or more of the multicast feedback timer or a multicast retransmission timer based at least in part on the multicast transmission.

Aspect 18: The method of aspect any one of aspects 1 through 17, further comprising: determining an active duration of a unicast discontinuous reception cycle based at least in part on a unicast operation; determining the active duration of the multicast discontinuous reception cycle based at least in part on a multicast operation, wherein a portion of the active duration of the unicast discontinuous reception cycle overlaps a portion of the active duration of the multicast discontinuous reception cycle; and determining to monitor the active duration of the unicast discontinuous reception cycle or the active duration of the multicast discontinuous reception cycle based at least in part on a comparison of a priority level of the unicast operation with a priority level of the multicast operation.

Aspect 19: The method of any one of aspects 1 through 18, further comprising. terminating a timer associated with a unicast operation based at least in part on a duration of the timer overlapping with the active duration of the multicast discontinuous reception cycle, wherein the timer comprises one or more of a unicast inactivity timer, the unicast feedback timer, or a unicast retransmission timer; or terminating a timer associated with a multicast operation based at least in part on a duration of the timer overlapping with an active duration of a unicast discontinuous reception cycle, wherein the timer comprises one or more of a multicast inactivity timer, the multicast feedback timer, or a multicast retransmission timer Aspect 20: An apparatus for wireless communication at a user equipment (UE) comprising at least one means for performing a method of any one of aspects 1 through 18.

Aspect 21: An apparatus for wireless communication at a user equipment (UE) comprising a processor; memory in electronic communication with the processor; and instructions stored in the memory and executable by the processor to cause the apparatus to perform a method of any one of aspects 1 through 18.

Aspect 22: A non-transitory computer-readable medium storing code for wireless communication at a user equipment (UE), the code comprising instructions executable by a processor to perform a method of any one of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc the disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein, but is to be accorded the broadest scope consistent with the principles and novel features disclosed herein.

What is claimed is:

1. A method for wireless communication at a user equipment (UE), comprising:
    receiving, in an active duration of a multicast discontinuous reception cycle, downlink control information indicating resources of a downlink data channel for a multicast message for a plurality of UEs including the UE;
    monitoring the indicated resources for the multicast message;
    transmitting, based at least in part on the monitoring the indicated resources, a feedback message corresponding to the multicast message; and
    initiating a multicast feedback timer based at least in part on the monitoring the indicated resources for the multicast message, the multicast feedback timer indicating a time to begin monitoring for a retransmission of the multicast message, the multicast feedback timer different than a unicast feedback timer associated with unicast messages for the UE.

2. The method of claim 1, further comprising initiating a multicast retransmission timer following the multicast feedback timer, the multicast retransmission timer indicating a time duration for the monitoring for the retransmission of the multicast message, wherein the multicast retransmission timer is different than a unicast retransmission timer associated with the unicast messages.

3. The method of claim 1, further comprising initiating a multicast retransmission timer following the multicast feedback timer, the multicast retransmission timer indicating a time duration for the monitoring for the retransmission of the multicast message, the multicast retransmission timer having a same value as a unicast retransmission timer associated with the unicast messages.

4. The method of claim 1, further comprising receiving a timer configuration corresponding to a multicast service associated with the multicast message, wherein initiating the multicast feedback timer is based at least in part on the timer configuration.

5. The method of claim 4, wherein receiving the timer configuration comprises receiving the timer configuration via a multicast control channel or UE-specific signaling, wherein the timer configuration comprises one or more of an indication of a duration of the multicast feedback timer or a duration of a multicast retransmission timer.

6. The method of claim 1, wherein the downlink data channel comprises a physical downlink shared channel.

7. The method of claim 1, further comprising determining a resource allocation related to the feedback message, the resource allocation comprising common resources associated with the plurality of UEs, including the UE, wherein transmitting the feedback message comprises transmitting the feedback message on resources of the common resources.

8. The method of claim 7, wherein one or more of a duration of the multicast feedback timer or a duration of a multicast retransmission timer associated with the UE of the plurality of UEs is aligned with one or more of a duration of a different multicast feedback timer or a duration of a different multicast retransmission timer associated with a different UE of the plurality of UEs.

9. The method of claim 1, further comprising determining a resource allocation related to the feedback message, the resource allocation comprising UE-specific resources associated with the UE, wherein transmitting the feedback message comprises transmitting the feedback message on resources of the UE-specific resources.

10. The method of claim 9, further comprising transmitting the feedback message over a transmission time interval associated with the UE and on the resources of the UE-specific resources, wherein the transmission time interval corresponds to a plurality of transmission time intervals associated with the plurality of UEs including the UE.

11. The method of claim 1, wherein initiating the multicast feedback timer comprises:
    initiating the multicast feedback timer after one or more of receiving the downlink control information on a downlink control channel or receiving the downlink data channel for the multicast message; and
    initiating a multicast retransmission timer following the multicast feedback timer based at least in part on an ending of the multicast feedback timer.

12. The method of claim 1, further comprising:
    determining a resource allocation related to the feedback message, the resource allocation comprising common resources; and
    initiating the multicast feedback timer after transmitting the feedback message based at least in part on the resource allocation comprising the common resources.

13. The method of claim 1, further comprising:
    determining a resource allocation related to the feedback message, the resource allocation comprising UE-specific resources; and
    initiating, based at least in part on the resource allocation, the multicast feedback timer after one or more of receiving the downlink control information on a downlink control channel or receiving the downlink data channel for the multicast message.

14. The method of claim 1, further comprising:
    receiving, in a second active duration of the multicast discontinuous reception cycle, the downlink control information indicating the resources of the downlink data channel for the multicast message for the plurality of UEs, including the UE; and receiving a retransmission of the multicast message in the second active duration of the multicast discontinuous reception cycle, wherein the retransmission comprises a unicast message for the UE.

15. The method of claim 14, further comprising monitoring, in an active duration of a unicast discontinuous reception cycle, for the downlink control information indicating the resources of the downlink data channel for the multicast message for the plurality of UEs, including the UE.

16. The method of claim 14, further comprising:
determining that the retransmission of the multicast message comprises a unicast transmission; and
initiating one or more of the unicast feedback timer or a unicast retransmission timer based at least in part on the unicast transmission.

17. The method of claim 14, further comprising:
determining that the retransmission of the multicast message comprises a multicast transmission; and
initiating one or more of the multicast feedback timer or a multicast retransmission timer based at least in part on the multicast transmission.

18. The method of claim 1, further comprising:
determining an active duration of a unicast discontinuous reception cycle based at least in part on a unicast operation;
determining the active duration of the multicast discontinuous reception cycle based at least in part on a multicast operation, wherein a portion of the active duration of the unicast discontinuous reception cycle overlaps a portion of the active duration of the multicast discontinuous reception cycle; and
determining to monitor the active duration of the unicast discontinuous reception cycle or the active duration of the multicast discontinuous reception cycle based at least in part on a comparison of a priority level of the unicast operation with a priority level of the multicast operation.

19. The method of claim 1, further comprising terminating a timer associated with a unicast operation based at least in part on a duration of the timer overlapping with the active duration of the multicast discontinuous reception cycle, wherein the timer comprises one or more of a unicast inactivity timer, the unicast feedback timer, or a unicast retransmission timer; or terminating a timer associated with a multicast operation based at least in part on a duration of the timer overlapping with an active duration of a unicast discontinuous reception cycle, wherein the timer comprises one or more of a multicast inactivity timer, the multicast feedback timer, or a multicast retransmission timer.

20. An apparatus for wireless communication at a user equipment (UE), comprising:
a processor,
memory coupled with the processor; and
instructions stored in the memory and executable by the processor to cause the apparatus to:
receive, in an active duration of a multicast discontinuous reception cycle, downlink control information indicating resources of a downlink data channel for a multicast message for a plurality of apparatuses, including the apparatus;
monitor the indicated resources for the multicast message;

transmit, based at least in part on the monitoring the indicated resources, a feedback message corresponding to the multicast message; and
initiate a multicast feedback timer based at least in part on the monitoring the indicated resources for the multicast message, the multicast feedback timer indicating a time to begin monitoring for a retransmission of the multicast message, the multicast feedback timer different than a unicast feedback timer associated with unicast messages for the UE.

21. The apparatus of claim 20, wherein the instructions are further executable by the processor to cause the apparatus to initiate a multicast retransmission timer following the multicast feedback timer, the multicast retransmission timer indicating a time duration for the monitoring for the retransmission of the multicast message, wherein the multicast retransmission timer is different than a unicast retransmission timer associated with the unicast messages.

22. The apparatus of claim 20, wherein the instructions are further executable by the processor to cause the apparatus to initiate a multicast retransmission timer following the multicast feedback timer, the multicast retransmission timer indicating a time duration for the monitoring for the retransmission of the multicast message, the multicast retransmission timer having a same value as a unicast retransmission timer associated with the unicast messages.

23. The apparatus of claim 20, wherein the instructions are further executable by the processor to cause the apparatus to receive a timer configuration corresponding to a multicast service associated with the multicast message, wherein the instructions to initiate the multicast feedback timer are further executable by the processor based at least in part on the timer configuration.

24. The apparatus of claim 23, wherein the instructions to receive the timer configuration are executable by the processor to cause the apparatus to receive the timer configuration via a multicast control channel or UE-specific signaling, wherein the timer configuration comprises one or more of an indication of a duration of the multicast feedback timer or a duration of a multicast retransmission timer.

25. The apparatus of claim 20, wherein the instructions to initiate the multicast feedback timer are executable by the processor to cause the apparatus to:
initiate the multicast feedback timer after one or more of receiving the downlink control information on a downlink control channel or receiving the downlink data channel for the multicast message; and
initiate a multicast retransmission timer following the multicast feedback timer based at least in part on an ending of the multicast feedback timer.

26. The apparatus of claim 20, wherein the instructions are further executable by the processor to cause the apparatus to:
determine a resource allocation related to the feedback message, the resource allocation comprising common resources; and
initiate the multicast feedback timer after transmitting the feedback message based at least in part on the resource allocation comprising the common resources.

27. The apparatus of claim 20, wherein the instructions are further executable by the processor to cause the apparatus to:
determine a resource allocation related to the feedback message, the resource allocation comprising UE-specific resources; and
initiate, based at least in part on the resource allocation, the multicast feedback timer after one or more of receiving the downlink control information on a downlink control channel or receiving the downlink data channel for the multicast message.

28. The apparatus of claim 20, wherein the instructions are further executable by the processor to cause the apparatus to:
   receive, in a second active duration of the multicast discontinuous reception cycle, the downlink control information indicating the resources of the downlink data channel for the multicast message for the plurality of apparatuses, including the apparatus; and
   receive a retransmission of the multicast message in the second active duration of the multicast discontinuous reception cycle, wherein the retransmission comprises a unicast message for the apparatus.

29. The apparatus of claim 28, wherein the instructions are further executable by the processor to cause the apparatus to monitor, in an active duration of a unicast discontinuous reception cycle, for the downlink control information indicating the resources of the downlink data channel for the multicast message for the plurality of apparatuses, including the apparatus.

30. An apparatus for wireless communication at a user equipment (UE), comprising:
   means for receiving, in an active duration of a multicast discontinuous reception cycle, downlink control information indicating resources of a downlink data channel for a multicast message for a plurality of UEs, including the UE;
   means for monitoring the indicated resources for the multicast message;
   means for transmitting, based at least in part on the monitoring the indicated resources, a feedback message corresponding to the multicast message; and
   means for initiating a multicast feedback timer based at least in part on the monitoring for the multicast message, the multicast feedback timer indicating a time to begin monitoring for a retransmission of the multicast message, the multicast feedback timer different than a unicast feedback timer associated with unicast messages for the UE.

* * * * *